United States Patent
Todt et al.

(10) Patent No.: US 8,637,139 B2
(45) Date of Patent: Jan. 28, 2014

(54) WATER VAPOR PERMEABLE SHRINKABLE-FABRIC

(75) Inventors: Gregory L. Todt, Union, MI (US); Seckin Ozol, South Bend, IN (US)

(73) Assignee: Transhield Technology AS (NO)

(*) Notice: Subject to any disclaimer, the term of this patent is extended or adjusted under 35 U.S.C. 154(b) by 377 days.

(21) Appl. No.: 13/056,314

(22) PCT Filed: Aug. 18, 2009

(86) PCT No.: PCT/US2009/054183
§ 371 (c)(1),
(2), (4) Date: Jan. 28, 2011

(87) PCT Pub. No.: WO2010/022066
PCT Pub. Date: Feb. 25, 2010

(65) Prior Publication Data
US 2012/0015161 A1   Jan. 19, 2012

Related U.S. Application Data

(60) Provisional application No. 61/089,742, filed on Aug. 18, 2008.

(51) Int. Cl.
*B32B 5/00* (2006.01)
(52) U.S. Cl.
USPC ........ 428/198; 428/195.1; 428/201; 428/212; 206/811

(58) Field of Classification Search
USPC ............... 428/195.1, 198, 201, 212; 206/811
See application file for complete search history.

(56) References Cited

U.S. PATENT DOCUMENTS

| | | | |
|---|---|---|---|
| 5,736,231 A | 4/1998 | Todt | |
| 2003/0190463 A1 | 10/2003 | Inoue et al. | |
| 2007/0264897 A1 | 11/2007 | Collias | |
| 2008/0105612 A1 | 5/2008 | Chappas | |
| 2008/0176468 A1 | 7/2008 | Chen | |

FOREIGN PATENT DOCUMENTS

| | | |
|---|---|---|
| JP | H10-081359 | 3/1998 |
| JP | 2002-096432 | 4/2002 |
| JP | 2002-160706 | 6/2002 |
| JP | 2004-330692 | 11/2004 |
| WO | WO 96/11804 | 4/1996 |

*Primary Examiner* — Mark Ruthkosky
*Assistant Examiner* — Christopher Polley
(74) *Attorney, Agent, or Firm* — Faegre Baker Daniels, LLP

(57) ABSTRACT

A shrinkable-stretchable polymeric laminated structure is made up of a shrink-stretch film on the outside and a nonwoven on the inside, with or without an adhesive. Preferably the film, nonwoven and adhesive are made from the same polymer family, including copolymers, which renders the laminate 100% recyclable. The film, nonwoven, and adhesive are modified to provide different responses to heat in addition to controlled water vapor permeability. The structure allows for water vapor permeability in one direction (inside-to-outside) and not in the opposite direction to allow wrapped article to dry or to keep wrapped articles dry and prevent corrosion related damage.

19 Claims, 5 Drawing Sheets

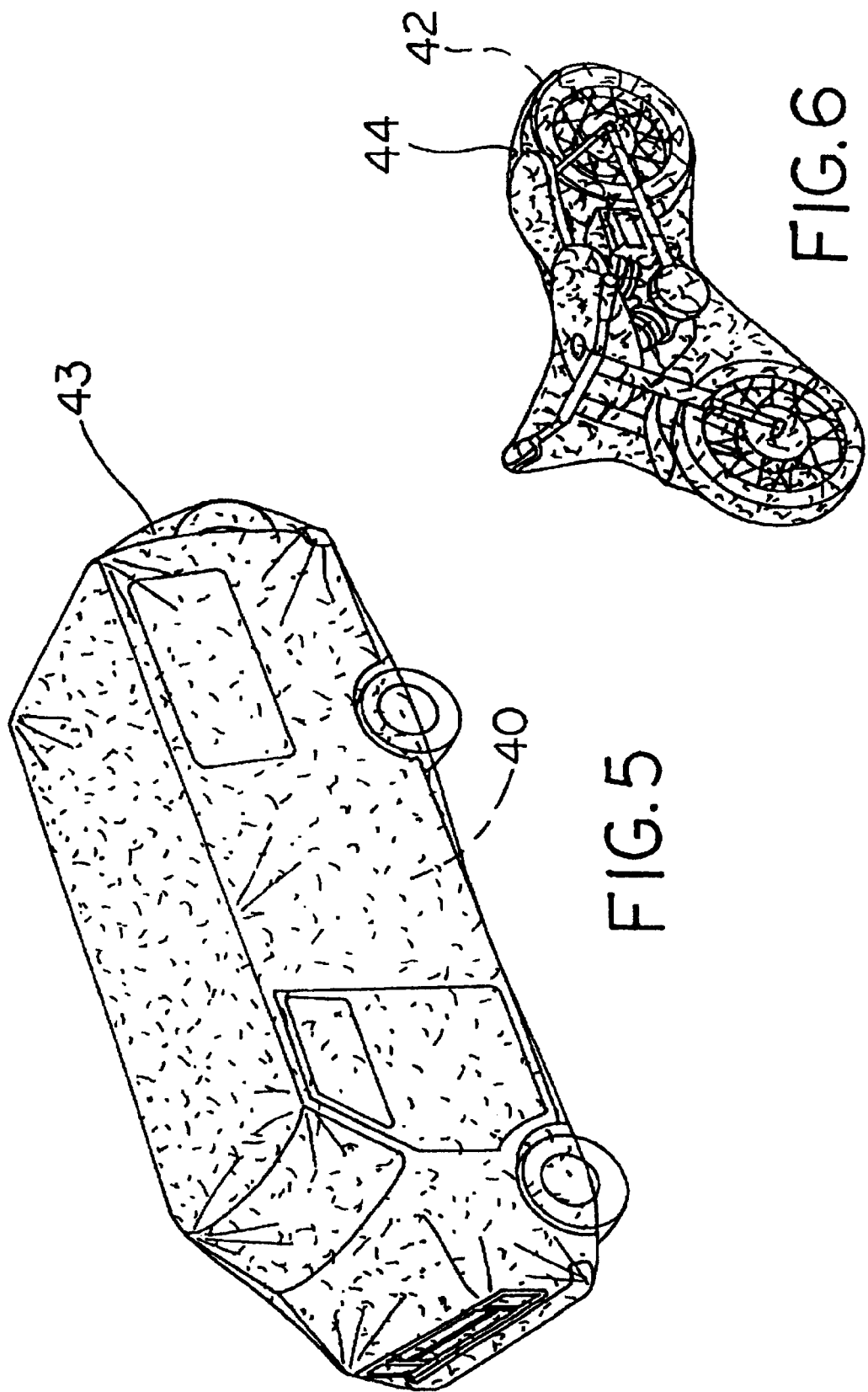

WATER VAPOR PERMEABLE SHRINKABLE-FABRIC

CROSS-REFERENCE TO RELATED APPLICATIONS

This application is a national stage of International Application No. PCT/US2009/054183 filed Aug. 18, 2009 which claims the benefit of U.S. Provisional Application Ser. No. 61/089,742 filed on Aug. 18, 2008. The entire disclosures of which are incorporated herein by reference.

BACKGROUND

This section provides background information related to the present disclosure which is not necessarily prior art.

Products such as automobiles, boats, military and industrial equipment that are transported by land, sea or air, are susceptible to damage from their environment. During transportation, such products are either placed inside shipping containers or they are carried open to the environment. In the case of industrial and especially military vehicles and equipment, which are subject to long periods of outdoor storage, where the environment can cause severe corrosion damage; a protective cover becomes an essential product. Methods of protecting such objects have been developed over the years and, U.S. Pat. Nos. 5,491,017; 5,523,812; 5,712,008; 6,562,740B1, and 5,736,231 each of which is hereby expressly incorporated by reference, all provide an extensive background on protecting articles during transportation and/or storage over long periods of time. However, the products described under each of these patents do not sufficiently address problems which arise from moisture and/or condensation.

Either during transportation or in storage, items to be protected are often subject to condensation. In nature condensation occurs when a vapor is cooled to its dew point. Water vapor condenses onto a surface when the surface of that object is cooler then the temperature of the water vapor. Condensation occurs regularly in the environment especially during early hours of the day, when the weather temperature raises faster then the surface temperatures of vehicles and other objects, especially objects made from metal.

Infrastructure, such as highway bridges, with open metal beams, railroad and airport equipment, as well as utilities such as open pipelines and cell phone towers and their components are all subject to repeat condensation as change, in temperature occur.

According to Corrosion Basics: An Introduction by Pierre R. Roberge; a fundamental requirement for atmospheric-corrosion processes is the presence of a thin film electrolyte that can form on metallic surfaces when exposed to a critical level of humidity. The critical level of humidity is material dependent, but most objects are subject to higher levels of corrosion in higher relative humidity environments (coastal areas) however, when relative humidity is below 30%, the corrosion is less likely to occur. Condensation that occurs on the surface of a metal object, a vehicle or a boat represents 100% Relative Humidity. From the time the condensation starts on a surface to the time when temperatures reach to equilibrium, the relative humidity on that object is 100%, therefore increasing the rate of corrosion and possibly growth of mold and mildew on that surface.

Pollutants that are present in the environment where condensation occurs also play a role. For example, sulfur dioxide and nitrogen oxides, which are the gaseous product of the combustion of fuels that contain sulfur such as coal, diesel fuel, gasoline, and natural gas also contribute greatly to the extent of corrosion. If these pollutants are already present on the surface of the object before being wrapped, when condensation takes place they help increase the rate of corrosion under the wrapping material.

Micro-perforation of films has been used in an effort to address moisture/condensation issues, but such applications decrease the physical properties of the film. In case of a shrink film, micro-perforations get larger due to heat applied and make the film even weaker. In order to protect an object/surface from environmental hazards, including corrosion, it is important that the object being wrapped is also dry on the inside. In order to create and more importantly keep a dry environment, it is preferred that the wrapping material start removing moisture/condensed water from the surface being protected, as quickly as possible and not let it back in which often occurs when micro-perforated films are employed. Under all anti-condensating applications it is preferred that the wrapping material not allow any liquid water, such as rain, inside. It is also preferred that the amount of water vapor going away from the surface be greater then the amount of water vapor going towards the surface.

SUMMARY

In various aspects, packaging products disclosed herein are laminations or laminates of a film and a fabric, preferably joined with an adhesive. The film is a shrink-stretch film with high water vapor permeability in a controlled direction, while the fabric is preferably a hydro-entangled nonwoven. It is preferred that all components—the film, the nonwoven, and, if employed the adhesive—be made largely from the same polymer, especially ethylene homopolymers and copolymers. It is also advantageous if the film, the adhesive and the nonwoven have different heat responses, in order to provide best fit onto an object being covered.

The film is typically co-extruded at 3, 5, 7, 9 or more layers depending on the capacity of the production line. For some applications, a desired overall film thickness is about 1 mil to about 12 mils or 3 mils to 9 mils (about 76 microns to 229 microns), but the invention is not limited to these numbers. The polymer structure of the film is most preferred to be from polyolefins such as polypropylene and ethylene homopolymers or copolymers such as HDPE, LDPE, and LLDPE. Certain ionomers can also be added to the polymer matrix to form the film Suitable matrix polymers include LLDPE and ethylene copolymers, which can be further modified by chemical groups such as silanes and titanates. In a preferred embodiment, at least 50% of the overall polymer component by weight of the film is LLDPE.

In various embodiments, water vapor transmission rates of the films are controlled by formulating with certain fatty acid modified ionomers, which act in part by modifying the crystalline morphology of the polyolefin, (e.g. LLDPE) composition. Suitable ionomers include so-called "K-ionomers," which include those neutralized with potassium cations and sold under the FAMI-K or product number AD1099 designation. Preferably and typically, ionomers make up less than 50% by weight of polymers in the film. The K-ionomers can be used alone or they can be blended with other ionomers as well.

For example, smart vapor barrier technology from DuPont called "smart ionomers" may also be utilized in the films of the present invention. Product number of a resin available from Du Pont is AD1119. These include fatty acid modified ionomers neutralized with sodium, such as DuPont materials disclosed in U.S. Pub. No. 2007/0283652 and U.S. Pub. No.

2007/0287019. These patent publications provide useful description of the sodium neutralized ionomers, and are incorporated herein by reference.

The film structure is preferably pigmented and contains UV stabilizers as well as primary and secondary antioxidants to help during production of the film as well as during the lamination process and outdoor use. In various embodiments, the films have shrink properties that result from the presence of the ionomers, which provide points of crosslinking. When the crosslinked film is extended and cooled (such as in typical blowing operations to form the film), the cooled film responds to heat by returning to the unextended form, providing a shrink property. In a preferred embodiment, the shrink ratio between machine direction (MD) and the cross direction (CD) of the film is around 2:1 for most shrink applications.

In order to achieve a film strength suitable for use in wrapping or shrink wrapping objects to be protected, the films are formulated with crosslinkers, fillers, couplers, and the like as further described below. In addition to possessing adequate film strength, the film is formulated for efficient transport of water vapor through multiple layers of the film. In particular, the water vapor transmission rates of individual film layers increase with increasing distance from an interface with the nonwoven fabric of the laminate. As elaborated further below, this structure provides for one way flow of vapor away from an object to be protected and into the surrounding atmosphere.

The hot-melt adhesive to be used in the laminate can be based on EVA or more preferably on block-co-polymers, and most preferably totally saturated block-co-polymers for better durability against water and UV breakdown. Desired adhesive coverage of the laminate is 1 to 25 grams per square meter (gsm). Preferred adhesive composites include those disclosed in U.S. Ser. No. 61/054,728, filed May 20, 2008 and International Application PCT/US2009/030541 filed Jan. 9, 2009, the disclosures of which are useful for background information and are hereby incorporated by reference.

The fabric is preferably a nonwoven, and can have one or more layers depending on the application and the processing capabilities. A multilayer fabric is preferably built up of layers having different size fibers. The fabric is preferably from the same polymer family as the film, such as polyethylene and its co-polymers, to allow the laminate to heat seal, ultra-sonic seal or weld to itself. Fibers in various layers of the fabric can be modified by use of silane or titanate chemistry to allow it to be more or less hydrophilic depending on the application. A suitable areal weight of the fabric is 15 to 300 grams per square meter (gsm) depending on the application.

Multiple layers of non-woven fabric are incorporated into the laminate to provide an efficient wicking or transport of water vapor from the surface or volume being protected to the interface with the film. For example, the layer of fabric closest to (or in contact) the surface to be protected is formulated with fibers of a first small denier to provide efficient wicking. Other layers are formulated to be more hydrophilic than the first layer, to establish a one-way path for water and water vapor away from the protected article through progressively more hydrophilic layers of fabric.

In various embodiments, nonwoven fabrics are produced from low denier crimped polyethylene fibers by setting down at least two layers of fibers in cards, followed by needle punching or hydroentangling the fibers to make a fabric.

The laminate has sufficient physical properties for its intended application. For example a transport cover for a boat can have film thickness from 6 mils to 9 mils and nonwoven from 38 gsm to 50 gsm by non-limiting examples. It is desired that a laminate for the above application would have tensile strength between 1,500 to 2,000 psi per mil (thickness). Elmendorf tear strength is desired to be at least between 2,000 grams and 10,000 grams, 2% secant modulus to be between 7,500 to 12,000.

For wrapping an object to protect from damage caused by water vapor (i.e. when it is desired to maintain a relatively low relative humidity around the protected object), the water vapor transmission rate (wvtr) of the product is preferred to be no less then 30 grams/sq meter/day in the "inside-to-outside" direction and less then 30 grams/sq meter/day in the "outside-to-inside" direction. For some applications, the overall thickness of the laminate is preferred to be 11 to 90 mils.

In various embodiments, a laminate is provided as a shrink-stretch, laminated wrapping material, that is soft inside (non-woven) and tough on the outside (film), but overall provides a soft hand to form into a wrapping/cover material with suitable physical properties. In some embodiments, the water vapor transmission rate is regulated by relative humidity levels. The laminate can be fabricated into a bag or an automated bag and can also be vacuum formed or thermoformed to provide protective trays for automotive, industrial, aerospace, and military equipment and parts, in non-limiting embodiments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5 and 6 are views in perspective of a conversion van and a motorcycle respectively which have been wrapped with a material made pursuant to the present invention.

DETAILED DESCRIPTION

The present invention relates to a laminate of a shrink-stretch film, with a controlled water vapor permeation, preferably above 30 grams/sq meter/day, and high physical properties bonded to a fabric, optionally but preferably with a hot melt adhesive dispensed between the film and the fabric. In various embodiments, the film, adhesive and fabric are all made up from the same polymer or its co-polymers—preferably from polyolefins and most preferably from polyethylene and its co-polymers such as LLDPE, EVA, EMA and Ionomers—so that the laminate can be heat sealed, ultrasonically sealed or welded to itself or sewn in order to make a product such as a shrinkable bag, wrap or a shrinkable cover around an article which is being transported or stored. Fabrication of all components from a common material also enhances the recyclability of the laminates.

The shrink-stretch film laminated to a nonwoven either with or without a hot-melt adhesive preferably provides different heat response at each layer. As the shrink-stretch film starts to shrink due to heat, the adhesive on the lamination layer will soften and let go of 5% to 40% of all the bonds as it reaches its softening point. This reaction, then allows the nonwoven to release itself from the shrink film and form air pockets between the surface and the shrink film. By reacting differently to applied heat, the cover is able provide a shell made from the shrink film and a soft surface towards the object to be protected made from the nonwoven.

In many applications, it is important to keep the surfaces of the objects being stored or transported in good condition, free of any defects. This includes keeping the surface dry as much as possible. For these applications, the disclosed laminate provides improved surface protection by employing a nonwoven surface that is modified to remove water away from the surface as condensation starts to occur. The hydrostatic pressure of the condensed water is converted into a hydrokinetic pressure by lifting water with a wicking action, to keep it above the surface until the water vaporizes through the film layers.

The fabric of the laminate can be made from any polymer or co-polymer that can be converted into a nonwoven web. In various embodiments, the fabric laminated to the film is from the same polymer family as the film. In this case polymers based on α-olefins, and in particular an ethylene homopolymer and its co-polymers are suitable for the application. Fabrics based on polyethylene fibers, especially fibers of low denier, are advantageous in various applications because the fibers are very soft and do not scratch sensitive surfaces being protected.

Figure 7A:
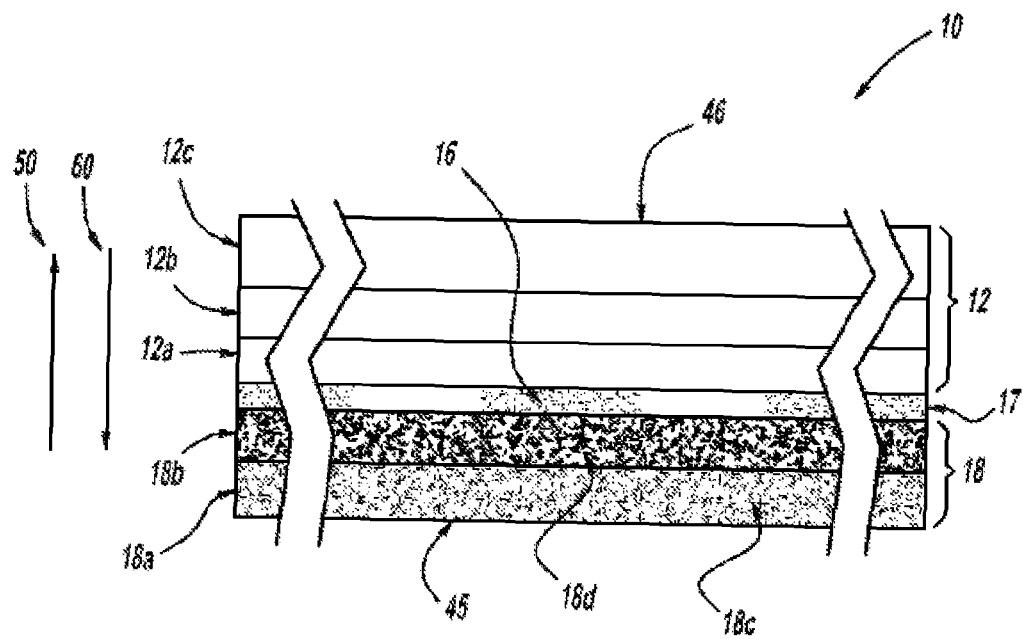
FIG. 7a is a cross sectional view, not necessarily to scale, of a laminate containing a two layer fabric and a three layer film.

In a non-limiting disclosure of a preferred embodiment, FIG. 7 illustrates in schematic cross section a laminate 10 made of a two layer fabric 18 bonded to a three layer film 12 with an adhesive composition 16 in the interface 17 between the film 12 and the fabric 18. The adhesive composition provides intermittent bonds between the film 12 and the fabric 18. For simplicity, the film is shown as three layers and the fabric 12 as two layers. As described herein, other layers are possible in both fabric and film.

The fabric side 45 is normally disposed in use toward and is often in contact with an object to be protected. A first layer 18a of the fabric 18 contains first fibers 18c of a first denier size, while the second layer 18b of the fabric 18 contains second fibers 18d of a second denier size. In a preferred embodiment the first denier size is smaller than the second denier size. As shown, the second fabric layer 18b is adjacent the interface 17.

Further in FIG. 7, a first film layer 12a is adjacent the interface and a second film layer 12b is adjacent the first layer 12a, and is situated at a greater distance from the interface. A third film layer 12c is adjacent the second layer 12b, and is also known as a skin layer or an outer layer of the film 12. The film layer 12a and fabric layer 18b adjacent the interface 17 are referred to as inner layers of the film and fabric, respectively. Layers 18a and 12c are in turn referred to as outer layers of the respective film and fabric. Layers such as 12b are referred to as middle or intermediate layers. That is, for the film or the fabric separately, direction is measured from the interface.

Figure 3:
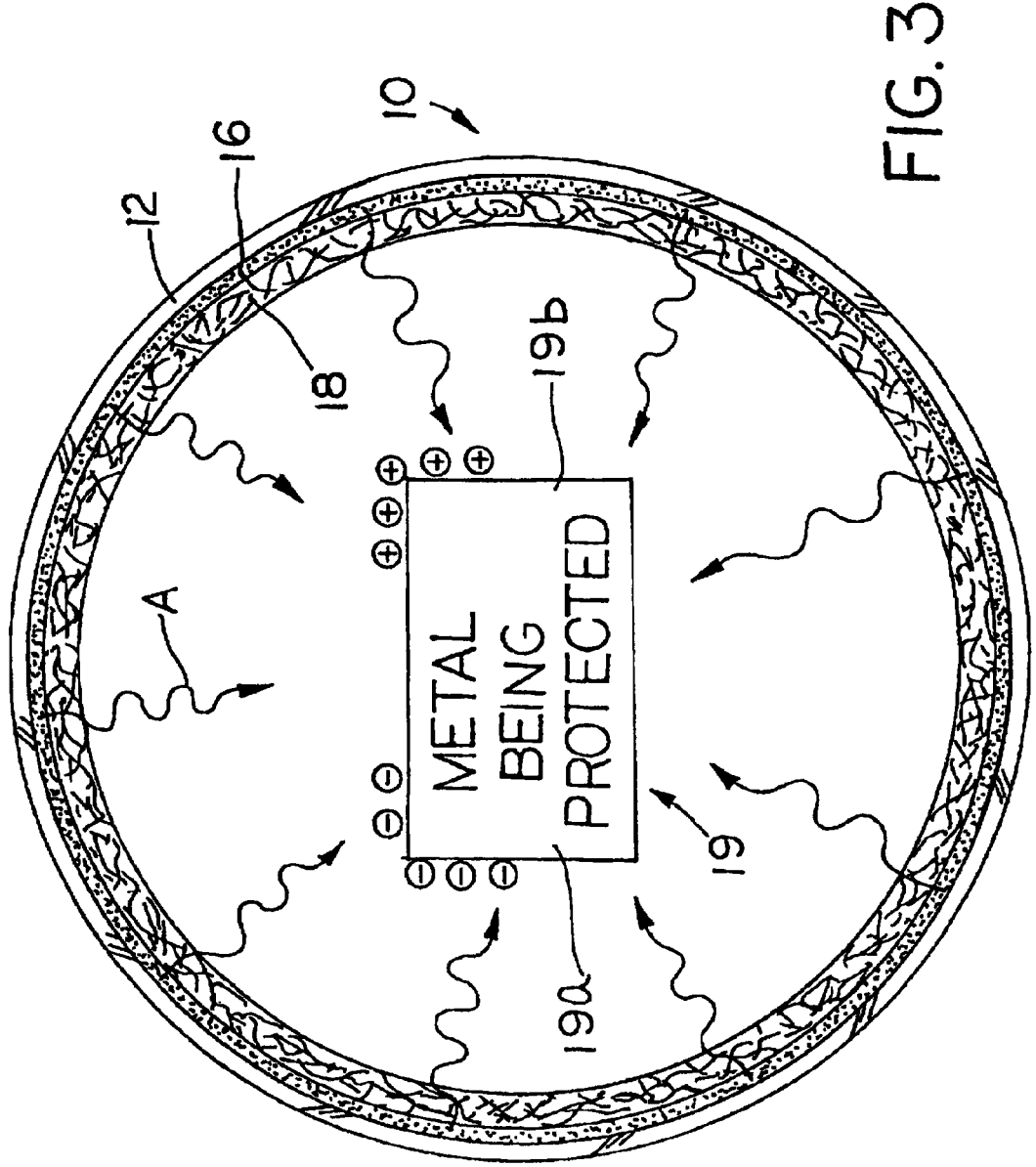
FIG. 3 is a view similar to FIG. 2, but illustrating the manner in which the present invention inhibits corrosion of products wrapped with the wrapping material of FIGS. 1 and 2.

In a typical use as illustrated in FIG. 3, moisture in the form of water vapor enters the laminate 10 on the fabric side 45 and proceeds through the laminate 10 in an "inside-to-outside" direction illustrated by arrow 50 and exits to the outside environment through the film side 46 of the laminate 10. The fabric layers 18a and 18b and the film layers 12a, 12b, and 12c (and other film and fabric layers if present) are preferably constituted according to the present disclosure in such a way that transmission of water vapor in an "outside-to-inside" direction 60 is essentially hindered. In any event, the net flow of vapor is in the direction 50 from the surface or volume being protected to the outside environment.

The desired direction 50 of vapor flow is also indicated by naming the fabric side 45 as the inner layer, inside, inside layer—or similar term—of the laminate 10. Likewise, the film side 46 is also called the outside, outside layer, outer layer, and so on, of the laminate 10.

Figure 7B:
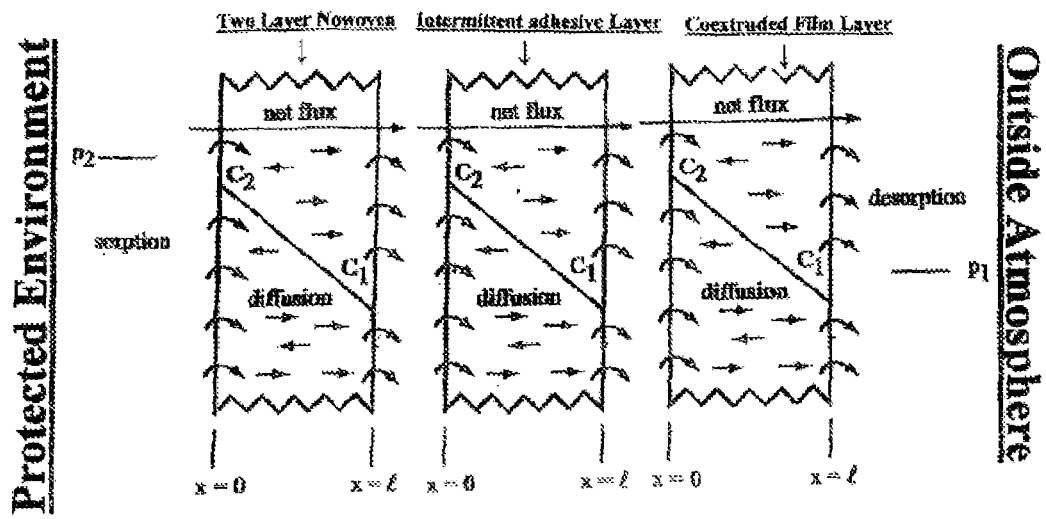
FIG. 7b illustrates flow of water through a laminate made of a nonwoven fabric and a co-extruded film.

FIG. 7b illustrates the process by which liquid water and vapor sorption, diffusion and desorption occurs through a two layer nonwoven, an intermittent adhesive layer, and a co-extruded film layer. Net flux is shown in FIG. 7b for each of the layers as a direction of positive flow of water vapor. Water enters the laminate nonwoven and is transported from the protected environment through each of the layers of the laminate, finally diffusing into the atmosphere with a positive directional flow. In FIG. 7b, P is the permeability coefficient of the laminate; $P_1$ is the permeability coefficient at the laminate inner surface; $P_2$ is the permeability coefficient of the exterior surface of the laminate; $C_2$ is the concentration of water at the beginning of the respective layer; $C_1$ is the concentration of water at the end of the respective layer; X=0 is the beginning of the respective layer; and 1 is the thickness of the respective layer.

In one embodiment, a packaging material in a sheet form has a first side for contacting an object to be packaged and a second side opposite the first side that is exposed in use. The packaging material comprises a water vapor permeable thermoplastic film, a hydrophilic nonwoven fabric in contact with the film along an interface, and a hot melt adhesive in the interface that intermittently bonds the film to the nonwoven fabric. The film has three or more individual layers characterized by increasing water vapor transmission rate with increasing distance from the interface. The fabric has two or more individual layers characterized by fibers of different denier, fibers of different hydrophilicity, or both. In various embodiments, the packaging material is further characterized by one or more of the following:

the film and nonwoven fabric are based on homopolymers and/or copolymers of ethylene;

the fibers of the nonwoven fabric are characterized by heat deflection temperature at 70° C. or higher;

the film comprises a plurality of carboxylate groups neutralized with potassium ions;

the film comprises low density polyethylene (LDPE) or linear low density polyethylene (LLDPE);

the film comprises a plurality of co-extruded layers, including an interface layer adjacent the interface, a skin layer forming an outside layer of the sheet, and one or more intermediate layers disposed between the interface and the skin layers;

the water vapor permeability and hydrophilicity of the skin layer of the film is higher than that of the interface layer;

the interface layer of the film comprises calcium carbonate and the skin layer of the film comprises a plurality of potassium neutralized carboxylate groups;

the nonwoven fabric of the packaging material comprises a plurality of layers including an interface layer adjacent the interface with the film and an outside layer forming the first side of the sheet, and wherein the hydrophilicity of the outside layer of the fabric is less than the hydrophilicity of the interface fabric layer;

the interface layer and the outside layer of the fabric contains fibers of different size, with the fibers of the interface layer being greater in diameter than the fibers of the outside layer;

the fabric is produced by carding the individual layers and hydro-entangling the fibers to form the fabric;

the nonwoven fabric comprises staple fibers made of LLDPE;

the fibers are spun from LLDPE nucleated to increase the crystallinity;

the fibers contain nanoclay to increase the HDT for production and end use;

the fibers of the fabric contain titanates; and the nonwoven fabric comprises fibers having a size in the range of from 1.2 to 1.5 denier.

The above list of features is illustrative and is not intended to be limiting. Other embodiments are possible by combining one or more of the various aspects mentioned above in a packaging material of the present disclosure.

In another embodiment, a packaging product is provided in sheet form wherein the sheet is made up of materials to build-up a laminate. The laminate comprises a first material made of a shrink-stretch film with suitable water vapor permeability and forming a first side of the sheet material. The laminate further comprises a second material forming a second side of the sheet material and comprising a multilayer nonwoven fabric wherein the multilayer fabric has a plurality of layers of differing hydrophilicity. The laminate further comprises a third material comprising a hot melt adhesive disposed at an interface between and bonding together the first and second material. In a preferred embodiment, the film, the fabric and the adhesive all contain homopolymers or copolymers of ethylene.

In various embodiments, the packaging product is further characterized by one or more of the following the film comprises a calcium carbonate filler;

the film comprises a polyolefin and an ionomer having a plurality of carboxylate groups that are at least partially neutralized with potassium;

the film comprises a plurality of layers including an interface layer adjacent the interface and one or more outside layers disposed on the interface layer, wherein the layers exhibit increasing vapor permeability in order of increasing distance from the interface;

the film layer at the interface comprises polyethylene (e.g., LLDPE) and calcium carbonate filler;

an outside layer of the film comprises a polyolefin material having a plurality of carboxylate groups at least partially neutralized with potassium;

one or more of the layers of the film contains molecular sieves to improve the water vapor transmission rate of the product;

molecular sieves are applied at different levels to different layers of the film to provide direction to water vapor transportation;

the thickness of the film is from 3 mils to 9 mils;

the fabric of the second material is made of layers having different fiber sizes;

the individual layers of the nonwoven fabric comprise crimp staple fibers;

the fibers of the nonwoven fabric comprise nucleated polyethylene modified with titanates;

the nonwoven fabric comprises fibers in a size range from 1.2 to 1.5 denier; and the hydrophilicity of the layers of the nonwoven fabric increases in order from the second side of the sheet material to the interface.

In another embodiment, polyethylene fibers are provided that combine a small denier size (e.g., 1-3 denier or 0.5 to 2 denier) with a heat distortion or heat deflection temperature higher than 70° C., such that the fibers are suitable for the spinning, carding, and other procedures needed in order to make the nonwoven fabrics described herein. In various embodiments, polyethylene fibers with 1-3 denier have a heat distortion temperature greater than 70° as measured by ASTM D 648 at a load of 455 kPa. In a preferred embodiment, the fibers are made of LLDPE. The fibers in various embodiments are further characterized by one or more of the following:

the fibers are of 1 to 1.3 denier;

the fibers are of 1.3 to 1.7 denier;

the fibers are in the form of a crimped staple fiber;

the fibers contain 0.5-6% by weight nanoclay; optionally the nanoclay is coated with titanate, zirconate, or silane coupling agents;

a nonwoven fabric is made from the fibers;

the nonwoven fabric comprises two or more layers wherein the fibers in the first layer are different denier than fibers of the second layer, when the first and second layers are adjacent;

a fabric comprises two or more layers and the fibers of a first layer have a different hydrophilicity than fibers of a second layer, when the first and second layers are adjacent;

a fabric is a multilayer fabric wherein fibers of a first layer differ from fibers of a second layer in both denier and hydrophilicity;

a layer of the fabric characterized by fibers of a higher denier is also characterized by fibers of higher hydrophilicity;

a first layer of a nonwoven fabric comprises fibers of 1 to 1.3 denier and a second layer of the fabric comprises fibers of 1.3 to 1.7 denier;

the fibers of the nonwoven fabric comprise a hydrophilic titanate or zirconate coupling agent material;

the fibers in one or more layers of the nonwoven fabric contain nanoclay particles to improve HDT;

fibers of higher denier in a multilayer nonwoven fabric comprise the hydrophilic titanate material;

a first layer of a multilayer nonwoven fabric comprises fibers of 1 to 1.3 denier and a second comprises fibers of 1.3 to 1.7 denier; and at least the fibers of the second layer further comprise a titanate or zirconate coupling agent;

the fabric is made by a spun-bond method;

the fabric is made by a melt blown method;

the fabric is made by a spun-laced method the nonwoven fabric has an areal weight of 10 to 200 grams per square meter;

a laminate is provided comprising any of the nonwoven fiber aspects shown above;

the laminate comprises a thermoplastic water vapor permeable film wherein the film and the fabric are intermittently bonded together at an interface by an adhesive composition;

a laminate is provided wherein both the fabric and the film are based on at least 50% by weight of an ethylene homopolymer or an ethylene copolymer having greater than 50 mol % ethylene units;

a laminate is provided wherein both the fabric and the film are based on greater than 50% by weight LLDPE;

a laminate is provided wherein the film comprises two or more layers and wherein the water vapor transmission rate of a first layer of the film adjacent the interface is less than the water vapor transmission rate of a second layer of the film adjacent the first layer;

a laminate is provided wherein at least one film layer comprises an ethylene homopolymer or copolymer and further comprises a fatty acid modified ionomer;

the ionomer found in a film layer of the laminate is a K ionomer;

an ionomer found in the film layer of a laminate is a Na ionomer;

In another embodiment, an extruded vapor permeable film is provided. The film contains 50 to 95% by weight of an ethylene homo- or copolymer, 5 to 45% by weight of an ionomer composition, 10 to 40% by weight of a filler, and 0.01 to 7% by weight of a hydrophilic coupling agent. In preferred embodiments, the film further comprises a polymer containing a plurality of epoxy groups (such as a copolymer of glycidyl methacrylate and other olefinic monomers) and/or maleic anhydride grafted polymers. When present, these additional polymeric materials provide dispersion and crosslinking of the film components. The film is provided as a single layer film or, in preferred embodiments, a multilayer film such as a three layer film. For a multilayer film, the above ranges of components represent the average of all the layers, while the individual layers have compositions that are further described herein.

The ionomer composition contains a polymeric material comprising a plurality of carboxylate groups, wherein a fraction of the carboxylate groups are neutralized with an alkali metal such as sodium or potassium. In a particular embodiment, an ionomer composition comprises an E/X/Y copolymer and a monobasic carboxylic acid having from 4 to 36 carbon atoms, wherein E is ethylene, X is at least one $C_{3-8}$ α,β-ethylenically unsaturated carboxylic acid, and Y is a softening co-monomer, wherein X is from about 2 to about 35% by weight and Y is from 0 to about 35% by weight of the E/X/Y copolymer, and wherein 70% or more of the acidic groups in the E/X/Y copolymer and organic acid are neutralized with metal ions; selected from sodium, potassium, or a combination of sodium and potassium.

In various embodiments, the extruded vapor permeable film is further characterized by one or more of the following:

the film comprises 50 to 80% by weight of the ethylene polymer or copolymer; 15 to 45% by weight of the ionomer composition, 15 to 35% by weight of the filler, and 0.1 to 0.8% by weight of the coupling agent;

the film is made of LLDPE;

in the ionomer composition, X is acrylic acid or methacrylic acid and Y is an ester of acrylic acid or methacrylic acid;

the hydrophilic coupling agent is a titanate;

the filler is one or more of titanium dioxide, calcium carbonate, or a mixture;

the ionomer composition contains carboxylate groups neutralized with potassium;

the ionomer composition comprises carboxylate groups neutralized with sodium;

the ionomer composition comprises carboxylate groups neutralized with a mixture of sodium and potassium;

the water vapor transmission rate of the film is greater than 30 grams per square meter per day;

a multilayer film is provided comprising a plurality of coextruded layers such as those described above;

a multilayer film has at least three layers A-B-C, wherein the concentration of ionomer in layer C is greater than that in layer B and the concentration of ionomer in layer B is greater than that in layer A;

a multilayer composite film is pigmented;

a composite film has three or more layers A-B-C, wherein the water vapor transmission rate of layer C is greater than that of layer B, which is greater than that of layer A;

a laminate is provided wherein a film or multilayer film described in any of the aspects above is adhered to a nonwoven fabric by an adhesive composition located at the interface between film and fabric;

the fabric of such a laminate comprises polyethylene fibers;

the ethylene fibers of the fabric are 1 to 3 denier;

the fibers of the laminate sheet are 1 to 2.5 denier;

the fibers of the laminate sheet are 1 to 2 denier;

the fibers of the laminate sheet are 1 to 1.3 denier;

the fibers of the laminate sheet are 1.3 to 1.7 denier;

the fabric has two or more layers;

the fabric has two or more layers wherein the fibers in a first layer are different denier than fibers in a second layer;

the fabric has two or more layers in the fibers of the first layer have a different hydrophilicity than the fibers of the second layer;

the laminate has a multilayer fabric wherein fibers of a first layer differ from fibers of a second layer in both denier and hydrophilicity;

the laminate has a multilayer fabric wherein a first layer of the fabric comprises fibers of 1 to 1.3 denier and a second layer of the fabric comprises fibers of 1.3 to 1.7 denier;

in a multilayer fabric comprising fibers of two different denier sizes, the fibers of higher denier also contain a hydrophilic titanate material; and a multilayer fabric is provided for the laminate sheet containing a first and second layer wherein the first layer contains fibers of 1 to 1.3 denier and the second layer of the nonwoven fabric contains fibers of 1.3 to 1.7 denier, and where the second layer further comprises a titanate or zirconate coupling agent;

multilayer fabric comprises fibers that contain 0.5% to 5% nanoclay for improved HDT;

As noted, various aspects of the embodiments described above and elaborated further herein, can be combined to provide suitable fabrics, films, and laminates. Further non-limiting description of different aspects of the invention follow:

1. Low Denier Polyethylene Fibers

In various aspects, polyethylene fibers are to be used in the laminate because they are soft compared to other polymers. This gives the laminate the advantage of not scratching the object to be protected. However, conventional polyethylene fibers tend to have insufficient heat deflection temperature and other physical properties, and in general lack the temperature stability for manufacture and use in the contemplated applications. In particular, conventional polyethylene fibers generally do not tolerate the heat generated during spinning. As staple fibers, they cannot be crimped, and/or tend not to survive the temperatures of the carding procedures. Further, because of their low heat distortion temperature, they tend not to tolerate conventional needlepunching or hydroentangling processes for nonwoven web formation. As such, they must be formed into webs by melt bonding or other processes that introduce points of bond. These points can scratch a sensitive and defeat the purpose of using soft polyethylene fibers.

The drawbacks are overcome by adding components that increase the heat deflection temperature. The fibers can then be used as stable or filament to prepare non-woven fabrics. The components include oxidation and UV stabilizers, as well as fillers such as nanoclay; and nucleating agents known for use in polymers generally but until now not taught for use in polyethylene fibers. In particular, low denier polyethylene fibers (for example, fibers of 1-3 denier) are produced by spinning (extruding through spinnerets) a melt that contains
1) a polyethylene polymer or copolymer;
2) a stabilizing package that can contain
   a) a primary antioxidant;
   b) a secondary antioxidant; and/or
   c) a UV stabilizing package such as a HALS (hindered amine light stabilizer); and
3) a nucleating agent; and
4) a clay or nanoclay The low denier polyethylene fibers are characterized by heat deflection temperature (HDT) greater than 70° C., when measured by ASTM D648 at a load of 455 kPa.

The primary and secondary antioxidants and the UV stabilizing package (items 2a-2c) provide protection against oxidation and damage caused by ultraviolet radiation. The nucleating agent helps to control the crystallinity and, it has been found, the heat distortion temperature of the fiber. In various embodiments, the nucleating agent is selected from those of a type conventionally used to control crystallinity and nucleation in casting of polyethylene films. An example is Hyperform® HPN-20E, sold by Milliken. Chemically, the HPN-20E nucleating agent is said to be a carboxylic acid salt. The clay is a layered material such as an aluminosilicate that can be dispersed or exfoliated into the polyethylene. Because the flakes when exfoliated have dimensions on the order of a few tens of Angstroms, the clays can be referred to as a nanoclay. That is, nanoclay refers to the dimension of the exfoliated particles.

Primary antioxidants (also called free radical scavenging antioxidants) inhibit oxidation using chain-terminating reactions. In various embodiments, they have reactive OH or NH groups. Non-limiting examples include hindered phenol antioxidants and secondary aromatic amine antioxidants. Inhibition of oxidation occurs via a transfer of a proton from the antioxidant to a free radical species formed in a polymer chain. The radical resulting from the proton transfer is stable and does not extract a proton from the polymer chain.

Secondary oxidants (also referred to as hydroperoxide decomposers) decompose hydroperoxides into non-radical, non-reactive and thermally stable products. Secondary antioxidants are often used in combination with primary antioxidants to yield synergistic stabilization effects. In action, secondary antioxidants prevent the split of hydroperoxides into reactive alkoxy and hydroxy radicals. Commonly used secondary antioxidants include organophosphorous compounds and thiosynergists. Thiosynergists are sulfur-based hydroperoxide decomposers. Non-limiting examples include esters of 3,3-thiodipropionic acid. The thiosynergists react with a hydroperoxide to generate sulfoxides and sulfones. Sulfur-based hydroperoxide decomposers can be used in combination with hindered phenol antioxidants. The most common commercially available thiosynergists are based on either lauric or stearic acid.

Nucleating agents are compounds or compositions that function by increasing the temperature at which crystallization from the melt begins. In determining or assessing the effect of the nucleating agent, the onset of crystallization can be determined by differential scanning calorimetry (DSC). The amount of nucleating agent to be added to the polyethylene fibers is an amount suitable to raise the crystallization temperature of the melt by at least 1° C. compared to that without any nucleating agent. That is, a measurable rise in the crystallization temperature from using the nucleating agent tends to correlate to, or be a proxy for an increase in heat deflection temperature of the fiber. The minimum, maximum, or optimum amount of nucleating agent can be determined in individual cases from correlations of the levels added to the desired outcome (i.e., raising the crystallization temperature of the polymer and/or the deflection temperature of the fiber). In this aspect, the formulation is not dependent on an individual chemistry, but on the power of that chemistry to provide the needed increase in the crystallization temperature.

Incorporation of the clay or nanoclay into the polyethylene resin results in an exfoliated composition, wherein layers of clay are dispersed homogenously throughout the fiber matrix. Exfoliation of clay into the polyethylene results in a so-called nano-composite. To achieve complete exfoliation into the polymer resin, the clays are pre-treated with various coupling chemistries, a compatibilizing resin can be used along with the polyethylene, and/or the clays are dispersed into the nano-composite by agitation, ultrasound, grinding, and the like.

Suitable clays include aluminosilicate, which have a sheet-like (layered) structure, and contain silica $SiO_4$ tetrahedra bonded to alumina $AlO_6$ octahedra in a variety of ways. Suitable clays include the smectite clays, which have a 2 to 1 ratio of tetrahedra to the octahedra. A non-limiting example of a smectite clay is montmorillonite. In such clays, the thickness of the layers (platelets) is of the order of one nanometer. When dispersed or exfoliated, the aspect ratios of the platelets are high, typically 100-1500. The exfoliated clays have very high surface areas up to hundreds of square meters per gram. Normally, it is necessary to modify the clay to make it chemically compatible with the polymeric matrix. A variety of processes is known to make the clay "organophilic." Ion exchange with the clay, as well as the use of dispersing polymers are two such processes. Two examples of nanoclay are Closite Na+ and Closite 15A by Southern Clay Products.

In various embodiments, the clays are dispersed or exfoliated into the polymer resin after pre-treatment with coupling agents such as the titanates and zirconates described further herein.

In various embodiments, the nanoclay incorporated into the polyethylene matrix is provided at a treat amount of 0.25-15% by weight, 0.5-10% by weight, 0.5-9.0 percent by weight, 0.5 to 6.0% by weight, or 2-8% by weight. Process conditions are selected in order to form an exfoliated structure, wherein the layers of the clay have been completely separated and individual layers are distributed throughout the organic matrix.

In a non-limiting example an LLDPE fiber grade resin, such as ASPUN™ 6835A or ASPUN 6850A (two fiber grade polyethylenes produced by Dow Chemical and differing in melt flow index) is used. The fiber resin is modified before being converted into fibers, to improve the heat distortion temperature by adding anti-oxidants (e.g. IRGANOX B215), and UV stabilizers (e.g. TINUVIN 111). The heat and UV stabilizing package generally make up no more than 1.0% by weight of the resin to be made into fibers for the nonwoven. Furthermore the resin can be nucleated by adding a nucleating agent such as Miliken's Hyper-Form® HPN-20E, conveniently by way of a masterbatch. This step raises the crystallization temperature and has been observed to increase the heat distortion temperature (HDT) of the resulting fibers. Finally, a nanoclay such as montmorillonite is exfoliated at a level of about 1 to 15% by weight into the polymer matrix. Addition of these packages raises HDT of the fibers and makes them suitable both for production and post-production of the laminate. That is, through the use of appropriate additives at appropriate levels the heat distortion temperature can be raised by several degrees Celsius and preferably to a final value of 70° C. or higher (e.g., 70-80° C., 70-90° C., or 70-100° C.).

Optionally the fiber resin is modified with a titanate or a silane chemistry to enhance the physical characteristics of the fiber during converting and post-lamination.

2. Crimped Fibers of Polyethylene

Crimped staple fibers made of polyethylene are prepared by
- extruding a molten blend of the ingredients above through spinnerets;
- dressing the extruded fiber, for example with a silane,
- cutting and crimping the fiber to make a coiled fiber, and
- thermally setting the crimped fiber.

Before thermal setting, a low level of surface crosslinking can be applied to the fiber. It has been found that fibers made as discussed herein have sufficient heat distortion properties to withstand the temperature of crimping and thermal setting to produce a crimped fiber suitable for formation of a nonwoven web by needlepunching or hydroentangling.

3. Non-Woven Fabrics

Nonwoven fabrics for use in the laminates described herein are made of suitable fibers that provide for transport of water vapor toward the interface and thence through the fabric into the outside environment. Non-limiting examples include polyester and acrylic fibers. In a particular embodiment, the nonwoven fabric is fabricated from polyethylene fibers. For use in the laminates, the polyethylene fibers are preferably treated to increase their heat deflection temperature, as discussed in an earlier section of this disclosure.

In one embodiment, soft 1-3 denier polyethylene fibers are fabricated into a non-woven fabric for use in soft wipe applications and the like. In other embodiments, multilayer nonwovens are laminated together with a multilayer film to form a wrapping material further described herein.

The nonwovens of the present invention use fiber sizes in the microfiber range of 3.0 denier or less, more preferably from 1.0 denier to 2.5 denier or a combination of these sizes. Optionally the fibers used can be hollow to help with the flow of vapors and/or gases as stated in U.S. Pat. No. 4,838,904 which is hereby incorporated by reference.

The fibers for the present non-wovens are provided as filaments or as staple fibers. Fibers in the form of filaments can be spun-bond, melt blown, or air laid to provide nonwoven webs. In making a multilayer non-woven fabric according to the invention, the individual webs can be co-extruded to provide fabrics having the desired vapor permeability and wicking capabilities.

Staple fibers are normally crimped before further processing to make the non-woven fabrics.

In various embodiments, crimped staple fibers are carded into multiple layers, wherein the individual layers have the hydrophilicity and vapor wicking, liquid wicking, hydrophilicity, and vapor permeability properties further described herein.

In various embodiments, the successive cards are laid parallel (i.e. at the same angle, usually the machine direction) or at different angles (e.g. perpendicular to one another). After all of the cards are laid down, a non-woven fabric can be made by hydroentangling, needle punching, and the like. Alternatively, staple fibers can be spun flashed. If cards are laid down in different directions and preferably in a perpendicular fashion—for example a first card laid down in the machine direction (MD) and a second card at 90° in the transverse direction (TD)—a web is produced having higher strength in the machine direction, which is preferred for stretch applications.

The fibers, modified as described above to provide suitably high HDT, are made into a web by suitable processes such as spun laid and melt blown. An example, a spun bond/melt bond/spun bond web (SMS). In one embodiment the fibers are cut and crimped into a staple fiber and then formed into a web by carding. Any combination of these methods can be used depending on the manufacturing capabilities to create a multilayer nonwoven structure. After the web formation, the nonwoven can be bonded together by one or a combination of many methods known in the art, including but not limited to: chemical bonding (wetlaid), needlefelt, needlepunching, ultrasonic pattern bonding, and hydroentangling.

In various embodiments, nonwoven fabrics are produced from low denier crimped polyethylene fibers by setting down at least two layers of fibers, followed by needle punching or hydroentangling the fibers to make a fabric. By making the fabric with needle punching or hydroentangling, any step of melting the fibers is avoided. For some applications, this is advantageous because melting the fibers would provide a "point of bond" where the fibers melt and coalesce, and this point of bond would tend to scratch the surface of a sensitive object that is being protected by the laminate. However, the needle punching or hydroentangling steps subject the fibers to challenging conditions that require high heat distortion temperature and other physical properties provided by the fiber compositions. Also, for best entangling by needle punching or water jets, the fibers should be crimped, which subjects them to further high temperature and challenging manufacturing steps that conventional polyethylene fibers have until now been unsuited for.

The nonwoven fabric preferably has a multilayer structure such as a three layer structure or a two layer structure. Depending upon the application, the multilayer nonwoven can be modified by a scrim material as stated in U.S. Pat. No. 6,696,120 B1, the disclosure of which is incorporated by reference. In various embodiments, a multilayer fabric has different size fibers in its individual layers to take advantage of dissimilar wicking characteristics of these fibers. In particular, lower denier ("smaller") fibers are used in the "bottom" layer of the multilayer nonwoven fabric that is in contact with the object or volume to be protected when the laminate is in use as a protective wrap. Smaller size fibers tend to wick water at a faster rate than larger fibers. The smaller fibers wick at a faster rate at the surface and turn the hydrostatic pressure into a hydrokinetic pressure towards the upper layer of the nonwoven. The upper layer is normally made of larger fibers. In an unlikely event that liquid water gets inside film layer to the interface of film, adhesive and nonwoven it would take longer for the water to go back towards the surface (i.e. back through the fabric), because the large fibers at the interface do not tend to wick water at a fast rate. Once the liquid water is drawn away from the surface to be protected the water sits at the interface of nonwoven, adhesive and the shrink-stretch film.

In a preferred embodiment, the fibers are laid sequentially in at least two layers to make the fabric. The two layers contain fibers of different denier. The low denier fibers have higher capillary action than the higher denier fibers. As such, the high capillary fiber layer is preferably disposed in use toward the side subject to a high relative humidity that needs to be controlled or the water removed.

When the fiber is in the form of a filament, the layers are separately formed (by spun bond, melt blown, or air laid processes for example) and coextruded to form a multilayer nonwoven fabric. With staple fibers, the multilayer non-woven fabric is normally formed by laying individual fibers in separate cards, followed by needle punching or hydroentangling to form the non-woven fabric. Various embodiments involving multilayer non-wovens will be described herein referring to layers of fibers. It is to be understood that, where appropriate, the teachings about the layers refers to cards formed from crimping staple fibers or to layers formed from filament fibers.

In a preferred embodiment, the first layer is made of 1.1-1.3 denier, and the second layer is 1.3-1.7 denier. Depending on the application a wide variety of areal weights of the fibers can be provided in each layer. In various embodiments, 10-70 g/m$^2$ are provided in each layer. In a preferred embodiment, the nonwoven fiber has a total areal weight of about 50 g/m$^2$.

As noted, one function of the low denier fiber is to wick water away from the surface or the volume being protected. Once the water is wicked away from the surface by the low denier fibers of the first layer, the water enters the higher denier layer. In order to continue the water in the path away from the protected surface, the second layer of fibers is treated so as to be more hydrophilic than the low denier high capillary fibers. In this way, the water is led irreversibly in a direction away from the surface (or volume) being protected.

In preferred embodiments, the higher denier fibers of the second layer are formulated with components or other treatments to make them permanently hydrophilic. In an advance and innovation, the fibers of the second layer are formulated with specifically hydrophilic titanate coupling agents. This renders the fibers permanently hydrophilic. Two examples of hydrophilic titanates available through Kenrich Petrochemicals Inc. are LICA38J and NZ38J. LICA38J is characterized as soluble in water; and NZ38J is soluble in water at concentrations equal to, or less than 1%. Suitable coupling agents include those described below in the section on adhesives.

In preferred embodiments, the fibers of one or both of the layers contain fillers such as talc or clay, which acts to make the fibers cheaper and which acts as a heat sink, increasing the temperature stability of the fibers.

In a broad sense, a multilayer nonwoven fabric contains a first layer of smaller denier fibers and a second layer of larger denier fibers, with the fibers of both layers preferably being in the range of 1-2 denier for softness. Preferably, the second layer fibers are further treated to be permanently more hydrophilic than the first. The low denier fibers of the first layer have a higher capillary action than the fibers of the second layer. The nonwoven fabric optionally has 3$^{rd}$, 4$^{th}$, and other layers, as long as inclusion of other layers does not adversely affect the direction of flow of water vapor through the fabric. In various embodiments, each layer is at least as hydrophilic as the one before it, measured in the direction from the surface being protected to the outside environment. In this way, the multilayer nonwoven fabric provides a one way path for moisture. The multilayer non-woven fabric can also contain so-called neutral layers for strength. A neutral layer is one that is not necessarily more hydrophilic than its neighbor, but it is one with hydrophilic or wicking properties such that its presence in the multilayer fabric does not deleteriously affect water or vapor flow.

In preferred embodiments, the fibers can be made with masterbatch methods. In the first layer a polyethylene masterbatch contains the nucleating agent, the primary and secondary antioxidants, and the HALS. In second and subsequent layers, the masterbatch can further contain various agents that increase the hydrophilicity of the fibers, such as the noted hydrophilic titanates.

In subsequent fabric layers, if used, the masterbatch contains increasing amounts of the chemistry that provides the hydrophilic character. If the hydrophilic chemistry of subsequent layers is different from that of the second layer, then enough of the chemistry is added to the master batch to render each layer as hydrophilic, or preferably more hydrophilic, than the previous layer.

As noted, processes such as melt bonding create a "point of bond" that can more readily scratch a sensitive surface to be protected. Accordingly, it is preferred in some embodiments to form the nonwoven fabric by non-bonding processes such as needle punching and hydroentangling.

Hydrophilicity of a fiber or of a fabric or a single layer of a multilayer fabric made from the fiber is determined according to established methods. For example, hydrophilicity can be tested by applying drops of water to a fabric surface from a fixed height. The time required for the surface to be wetted by the droplet then provides information on the hydrophilicity of that fabric/fiber—the lower the wetting time, the more hydrophilic the fiber/fabric. As described for example in U.S. Pat. No. 4,073,993 one of the test methods is American Association of Textile Chemists and Colorists (AATCC) Standard Test Method 39-1971, Evaluation of Wettability. In the test, water droplets (15-25 drops per mL) are dropped every 5 seconds from a height of ⅜ in (1 cm) above the fabric. A stop watch is started from the time a drop falls. The wetting time is recorded as the time the water on the fabric loses its specular reflective power. An average of 10 droplets can be calculated. A faster wetting time equals to a higher level of hydrophilicity. Conveniently, the wetting test can be carried out on both sides of a multilayer fabric. Differing hydrophilicity is then indicated when the fabric has a faster wetting time on one side than on the other side.

4. Adhesives

In a preferred embodiment, the laminate contains an adhesive composition at the fabric/film interface. The adhesive bonds the film and fabric, preferably in an intermittent fashion. Preferred adhesives include those known as hot-met adhesives.

The adhesive composition is preferably based on a saturated block-co-polymer with sufficient primary and secondary antioxidants (similar to fiber application) and UV stabilizers. In various embodiments, the polymer used is the same polymer as used in the fabric and the film; this allows the laminate to be sealed to itself either by heat or ultrasonic welding, and tends to be advantageous for recycling as well. The viscosity of the adhesive composition is selected (not too high and not too low) to meet required flow for the pump mechanism during lamination, but not so low that it causes seepage on a hot day once laminated. The adhesive can be further modified with tack agents, vapor corrosion inhibitors (VCI) as stated on U.S. Pat. No. 5,705,566, and biocides, fillers and pigments if desired for a certain application. Titanate and/or zirconate coupling agents can be added to the adhesive to render the whole structure hydrophobic or hydrophilic depending on the application. Addition of titanates and/or zirconates between 0.01%-3% by polymer weight, into hot-melt adhesives also helps improve their viscosity characteristics (lower viscosity), especially if they have additives and/or fillers that can dramatically increase viscosity at high loadings.

Suitable adhesive formulations for use in the water permeable packaging of the present invention are disclosed in pending U.S. Application No. 61/054,728, filed May 20, 2008, and in International Application PCT/US2009/030541 filed Jan. 9, 2009, the disclosures of which give suitable background information and are hereby incorporated by reference. In various embodiments, the adhesive composition is applied to the interface at a rate of 1-30 g/m$^2$, 2-20 g/m$^2$ or 4-15 g/m$^2$.

The adhesive provides a strong initial bond between the fabric and the film, which tends to build over a period up to two weeks. A suitable initial bond strength is 200-400 grams per inch with a final bond strength of 200-2,000 grams per inch depending on the desired product.

The adhesive polymer used to formulate the adhesive compositions is preferably of the hot melt type, and is especially selected from thermoplastic polymers and thermoplastic elastomers such as AB and ABA diblock and tri-block elastomers. Thermoplastic polymers used in the adhesive compositions provide cohesive strength to the final adhesive material and provide a medium for dissolution or suspension of the adhesive ingredients. Thus, the thermoplastic polymer tends to act as a vehicle exhibiting the properties provided by the adhesive components and cooperates with the adhesive components to provide the final adhesive properties.

Hot melt adhesives, by definition, are selected from thermoplastic polymers that are heated to obtain a liquid of flowable viscosity. After application, the adhesives are cooled to be essentially solid. In the use of such adhesives, normally two surfaces to be joined by the adhesive are bonded while the adhesive is still fluid. Upon cooling, the adhesive sets and joins the two materials.

One class of polymers for use in the adhesive compositions is the rubbery block copolymer such as those derived from vinyl aromatic monomers and other rubbery monomers. Vinyl aromatic monomers include styrene. Rubbery monomers include butylene, ethylene, isobutylene, butadiene, isoprene, and others. The polymers are preferably in the form of block copolymers such as AB or ABA polymers where A and B represent blocks of different compositions. In block copolymers having some unsaturation, the material can be hydrogenated to reduce or eliminate the unsaturation. Such compositions include butadiene styrene block copolymers, isoprene styrene block copolymers, styrene isoprene styrene block copolymers, styrene butadiene styrene block copolymers, styrene ethylene butadiene styrene block copolymers (SEBS), and the like. Suitable styrene block copolymers are commercially available, for example from Kraton under the KRATON trade name. The styrene blocks segregate into distinct domains of high Tg that function as physical crosslinks The two-phase networks persist up to a temperature where the polymer becomes homogenous. The block copolymers are thus thermoplastic at some temperatures but upon cooling regain a two-phase morphology and elastomeric character. Because of this and because the low molecular weight of suitable thermoplastic elastomers gives compositions of suitably low viscosity, the materials are suitable as hot melt and pressure sensitive adhesives.

In some embodiments, the adhesive polymer has blocks based on ethylene homopolymers or ethylene copolymers. In preferred embodiments, the ethylene copolymers contain greater than 50 mol % ethylene units. In a particular embodiment, the adhesive is a tri-block ABA copolymer, wherein A is an ethylene homopolymer or copolymer block and where B is an ethylene copolymer block different from A. An example of a suitable adhesive includes an ABA tri-block copolymer, wherein A is a high density polyethylene (HDPE) block and B is a linear low density polyethylene (LLDPE) block.

In various embodiments, the thermoplastic adhesives are based on a segmented copolymer (or multi-block copolymer), wherein the copolymer contains two or more and preferably three or more segments or blocks differing in one or more chemical or physical properties. In an exemplary embodiment, the blocks are made from copolymerizing ethylene and at least one copolymerizable comonomer. Suitable segmented copolymers and methods of making them are described for example in Arriola et al., International Publication WO2005/090427, the disclosure of which is hereby incorporated by reference. Commercial embodiments of the so-called olefin block copolymers (OBC) are supplied by The Dow Chemical Company under the INFUSE trade name. For example, grades D9817.15 and D9807.15 are suitable.

The use of olefin block co-polymers based on copolymers of ethylene and a copolymerizable monomer eliminates styrene from the adhesive. When the adhesive is used as further described herein to laminate a wrapping material for protecting surfaces, the use of the adhesive also eliminates styrene from the laminated product. Elimination of styrene from the adhesive can be beneficial in that it improves heat sealing of the laminated product, since the whole structure can be made of polyolefin materials. For example, when the base adhesive is made of polyethylene and its copolymers, it allows the whole wrapping material to be LDPE based if the nonwoven and the film are also based on LDPE. When this is achieved, the wrapping material can be readily heat sealed or ultrasonically sealed to itself. This in turn permits creating smaller wrapping materials in an efficient manner. An example is automatic bags, where a sheet of wrapping material can be folded into a bag shape and sealed onto itself to create a bag. Eliminating styrene from the adhesive and from the laminated products will also improve post consumer recyclability of the wrapping material, especially for the situation where the film, adhesive, and nonwoven are based on a single type of polymer such as polyolefin, polyethylene, or ethylene copolymers such as LDPE.

In various embodiments, the olefin block copolymers are multi-block copolymers, preferably linear multi-block copolymers of two or more monomers, more especially ethylene and a $C_{3-20}$ olefin or cycloolefin, and most especially ethylene and a $C_{4-20}$ α-olefin. In another embodiment, the olefin block copolymers useful as adhesives in the compositions described herein are in the form of a segmented copolymer (or multi-block copolymer), especially such a copolymer comprising ethylene in polymerized form, the copolymer containing two or more and preferably three or more segments differing in comonomer content or density or other chemical or physical property. In exemplary embodiments, the copolymers can possess a molecular weight distribution or polydispersity $M_w/M_n$ of less than 3.0, preferably less than 2.8. In various embodiments, the segmented polymers are ethylene multi-block copolymers.

The term "multi-block copolymer" or "segmented copolymer" as used in the adhesive compositions described herein, refers to a polymer comprising two or more chemically distinct regions or segments (referred to as "blocks"). The segments or blocks are preferably joined in a linear manner, that is a polymer made up of chemically differentiated units joined end to end with respect to polymerized ethylenic functionality, rather than in pendant or grafted fashion. In various embodiments, the blocks differ in the amount or type of comonomer incorporated into the blocks, the density, the degree of crystallinity, the crystallite size attributable to a polymer of such composition, the type or degree of tacticity (isotactic or syndiotactic), regio—regularity or regio—irregularity, the amount of branching, the homogeneity, or any other chemical or physical property. Compared to other block copolymers, including copolymers produced by sequential monomer addition or anionic polymerization techniques, the olefin block copolymer useful as adhesives in the compositions of the invention are characterized by unique distributions of polydispersity (PDI or $M_w/M_n$), block length distribution, and/or block number distribution. More specifically, when produced in a continuous process, the polymers desirably possess PDI form 1.7-2.9, preferably from 1.8-2.5, more preferably from 1.8-2.2, and most preferably from 1.8-2.1. When produced in a batch, or a semi-batch process, the polymers desirably possess PDI from 1.0-2.9, preferably from 1.3-2.5, more preferably from 1.4-2.0, and most preferably from 1.4-1.8.

The olefin block copolymers can be referred to as an "ethylene multi-block copolymer." Such a term refers to a multi-block copolymer comprising ethylene and one or more copolymerizable comonomers, wherein ethylene comprises a plurality of the polymerized monomer units of at least one block or segment in the polymer, preferably 90% mol, more preferably at least 95% mol, and most preferably at least 98% mol of the block. Based on total polymer weight, the ethylene multi-block copolymers have a ethylene content from 25%-97% by weight, preferably from 40%-96% by weight, more preferably from 55%-95% by weight, and most preferably from 65%-85% by weight.

Suitable monomers for preparing the olefin block copolymers include ethylene and one or more copolymerizable monomers other than ethylene. Examples of suitable comonomers include straight chain or branched α-olefin of 3-30, preferably 3-20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. Others include cycloolefins of 3-30, preferably 3-20 carbon atoms, such as cyclopentene, cycloheptene, norbornene, 5-methyl-2-norbornene, tetracyclododecene, and the like. In various embodiments, the comonomers are chosen from di- and polyolefins such as butadiene, isoprene, 4-methyl-1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinylnorbornene, dicyclopentadiene, 7-methyl-1-6-octadiene, 4-ethylidene-8-methyl-1-7-nonadiene, and 5,9-dimethyl-1,4,8-decatriene.

VCI Particles

The adhesive compositions also contain a VCI particle dispersed in the adhesive polymer along with the coupling agents. The VCI particles are in the form of powder particles containing a carrier and minor amounts of a vapor phase corrosion inhibitor. The particles are suited to release a protective vapor in use. One example of a suitable vapor phase corrosion is a volatile amine. In non-limiting embodiments, the particles contain on the order of 0.1% to about 5% volatile amine corrosion inhibitor and contain about 95%-99.9% non-volatile material. In various embodiments the non-volatile material is made of a carrier or carrier that serves as a vehicle for delivery of the vapor phase corrosion inhibitor into the adhesive. Suitable carriers include those that are compatible with the adhesive polymer forming the matrix of the adhesive compositions described herein when the coupling agents are employed. Suitable carriers include inorganic carriers, generally in particle or powder form. In various embodiments the carriers are polymeric or non-polymeric. The particles, which can include a carrier or carriers and a vapor phase corrosion inhibitor as part of a proprietary composition sold by suppliers of VCIs, can be produced by spray drying, by way of non-limiting example. Designation of the particles as a "VCI powder" reflects the physical nature of the resulting VCI composition. In various embodiments, the carrier polymers are made of thermoplastic elastomers or other block copolymers, as long as they are compatible with the matrix. For recyclability, the polymeric carriers can be based on a polymer that is largely ethylene based.

Incorporation of the VCI particle results in incorporation of an additive into the adhesive compositions. VCI is formulated into adhesive formulation at a level sufficient to provide suitable corrosion protection in use. In general, levels of 0.1-20% by weight of the adhesive are suitable in most applications. In some embodiments, the VCI particles are incorporated at a level of about 5% to about 15% by weight, based on the total weight of the adhesive composition. The additive is known as a vapor corrosion inhibitor (VCI) and may be any of a number of well known additives. An additive sold by Cortec Corporation, St. Paul, Minn., and identified as M-138 is illustrative. This material is available in particulate form, and as long as the material is kept in a closed container, release of the material into the vapor form is minimal.

In addition to vapor corrosion inhibitors, other materials which may be added to the adhesive layer and which form a protective or treating vapor in the cavity enclosed by the wrapping material include anti-stats (static electricity removers and dissipaters), antioxidants, antimicrobials (to protect the product from bacteria and other biological contaminants), acid neutralizers, acid or bases (to effect pH changes), fragrances, additives that, when exposed to air, change color, thus indicating that the product has been tampered with, and others.

According to various aspects, an additive is added to a hot melt adhesive used to secure a fabric to a film and produce a wrap material used to protect articles. The additive releases a vapor into the package enclosed by the wrap material. The vapor mixes with the air enclosed within the package and any other vapors (such as moisture) in the cavity being protected. The vapor condenses on the surface of the product being protected and forms a thin, but highly effective, corrosion prohibiting layer or atmosphere. Should additional moisture enter the enclosed cavity, the vapor released by the additive forms it into a noncorrosive vapor. Furthermore, the film outer layer acts as a barrier preventing emission of the inhibitor into the atmosphere. Accordingly, the packaging material according to the present invention is a "one way" emitter, in which all of the additive is used to treat the product used with the material, and the additive is not emitted into the ambient atmosphere.

By placing the additive in the adhesive layer that adheres the fabric to the film layer, costs are reduced because less additive will be required and handling and inventorying are simplified. If the additive were placed in the film layer, the additive would release in both directions (both into the cavity enclosed by the material and outwardly into the atmosphere), thus requiring a substantially greater quantity of additive. By including the additive in the adhesive layer, the film acts as a barrier, preventing release of the vapor into the atmosphere. While it is possible to place the additive in the nonwoven fabric, the nonwoven would have to be put through a bath, which could potentially change the properties of the nonwoven fabric and reduce its cushioning, softness, and other desirable properties. Furthermore, if the additive were placed in either the film layer or in the nonwoven layer, separate quantities of film or nonwoven would have to be maintained in inventory for each of the additives that are to be used, and the additive would release continually from the time that the film or nonwoven is made. However, by putting the additive in the adhesive layer, the additive material can be kept in a closed container, and thus be prevented from releasing into the vapor form, until it is to be used. The additive can be mixed with the adhesive in its molten form just before the adhesive is placed in a dispenser, or the adhesive can be dispensed directly onto the adhesive layer at a different dispensing station adjacent the dispensing station through which the adhesive is dispensed onto the nonwoven layer. On the other hand, the adhesive can also be mixed with the additive when the adhesive is made and formed into block form prior to use. Since the additive will be encapsulated by the adhesive, release is minimized. By either dispensing the additive by separate station or mixing it with the adhesive just as the molten adhesive is placed in the dispenser, changing additive is effected almost immediately so that production interruptions are minimized.

The VCI can be produced in many different formats—powder, masterbatch or it can be carried in oil. A preferred format for the AAD system is the powder format. Two important considerations to keep in mind with the powder format is how to achieve a uniform blend throughout the adhesive manufacturing, and how to keep the properties of the adhesive so that the required viscosity levels during lamination and the required tack is not lost compared to the adhesive that does not have the AAD-VCI.

The VCI powder and the adhesive can be mixed together in a batch process. During the batch process, adhesive is placed in a mixer and the VCI powder—either separately or in a form pre-combined with a titanate and/or zirconate coupling agent as described herein—is placed slowly in the mixer in pre-set percentages. While a batch system produces acceptable results, it has been discovered that improvements in uniformity and reproducibility are achieved through the use of a continuous process, conveniently carried out in an extrusion apparatus such as a twin screw extruder.

The continuous process also produces adhesives of more uniform viscosity, which tends to minimize the need to run the downstream lamination process at variable temperatures to adjust for the higher or lower viscosity of test samples. Vapor corrosion inhibitors are heat sensitive by their nature. When the temperature is elevated there will be increase in the VCI release to the environment. So when higher temperatures are used during the lamination process, there could be a higher rate of VCI loss to the environment. It is generally preferred to run the lamination process at a consistent temperature and preferably as low a temperature as possible.

As noted, another step to improve product uniformity and to gain some of the lost viscosity characteristics of the hot-melt adhesive is to use various titanium and/or zirconium (Ti/Zr) coupling agents. Esters of titanium or zirconium couple or chemically bridge two dissimilar species such as inorganic filler/organic particulate/fiber and an organic polymer through proton coordination. Proton coordination may be interpreted as a form of plasticizing, since the filler is being modified to act more like the matrix resin. Under melt compounding shear conditions, the titanate and/or zirconate assists in the removal of air voids and moisture from the particle surface, resulting in complete dispersion and formation of a true continuous phase, thus optimizing filler performance.

Preferably, the coupling agent includes at least one compound selected from the group of compounds consisting of a titanate containing compound, a zirconate containing compound, and mixtures thereof. Examples include ethylenically unsaturated titanate containing compound and neoalkoxy titanate containing compounds. Non-limiting examples and their commercial designations from Kenrich Petrochemicals, Inc. include tetra (2,2 diallyloxymethyl)butyl-di(ditridecyl) phosphito titanate (KR 55), neopentyl(diallyl)oxy-trineodecanoyl titanate (LICA 01), neopentyl(diallyl)oxy-tri(dodecyl)benzene-sulfonyl titanate (LICA 09), neopentyl(diallyl) oxy-tri(dioctyl)phosphato titanate (LICA 12), neopentyl (diallyl)oxy-tri(dioctyl)pyro-phosphato titanate (LICA38), neopentyl(diallyl)oxy-tri(N-ethylenediamino)ethyl titanate (LICA 44), neopentyl(diallyl)oxy-tri(m-amino)phenyl titanate (LICA 97), neopentyl(diallyl)oxy-trihydroxy caproyl titanate (LICA 99), and mixtures thereof.

Further examples of coupling agents include ethylenically unsaturated zirconates and neoalkoxy zirconate containing compounds. Non-limiting examples from Kenrich include (2,2 diallyloxymethyl)butyl-di(ditridecyl)phosphito zirconate (KZ 55), neopentyl(diallyl)oxy-trineodecanoyl zirconate (NZ 01), neopentyl(diallyl)oxy-tri(dodecyl)benzene-sulfonyl zirconate (NZ 09), neopentyl(diallyl)oxy-tri(dioctyl) phosphato zirconate (NZ 12), neopentyl(diallyl)oxy-tri(dioctyl)pyro-phosphato zirconate (NZ 38), neopentyl(diallyl) oxy-tri(N-ethylenediamino)ethyl zirconate (NZ 44), neopentyl(diallyl)oxy-tri(m-amino)phenyl zirconate (NZ 97), neopentyl(diallyl)oxy-trimethacryl zirconate (NZ 33), neopentyl(diallyl)oxy-triacryl zirconate (NZ 39), dineopentyl(diallyl)oxy-di-p-aminobenzoyl zirconate (NZ 37), dineopentyl(diallyl)oxy-di(3-mercapto) propionic zirconate (NZ 66A), and mixtures thereof.

Exemplary titanates include LICA 38 and LICA 09 from Kenrich Petrochemicals Inc. It has been discovered that use of the Ti/Zr coupling agents improves the compatibility of UV stabilized adhesive such as SEBS with the VCI powder and achieves the required overall flow characteristics for the final adhesive.

The Ti/Zr coupling agents are added to the adhesive at levels sufficient to obtain the noted advantages. In various embodiments, at least 0.1%, at least 0.2%, at least 0.4%, or at least 0.5% by weight is added, relative to the weight of the VCI. In various embodiments, up to 5% or up to 6% are used, where all percentages are by weight based on the weight of the VCI. Thus in various embodiments, the adhesive contains 0.1-6%, 0.1-5%, 0.5-6%, or 0.5-5% of the Ti/Zr coupling agent, where the percentages are based on weight of the VCI particles.

In compounding, the Ti/Zr coupling agents can be added to the adhesive separately from the VCI particles, but at the noted weight ratios relative to the VCI. Alternatively or in addition, the VCI powder can be first combined with the coupling agent, and the resulting so-called "titanated" or "zirconated" VCI added as a single component to the adhesive. Thus, in one embodiment, VCI powder is sprayed with the Ti/Zr chemistry between 0.5% and 6.0% by weight to provide better compatibility between the VCI powder and the adhesive. Titanated VCI powder is termed VCI(T) in the Examples below.

Tackifiers

In various embodiments, the adhesive compositions contain tackifiers (also called "tackifying agents"). Due to addition of fillers in a hot melt adhesive, the base adhesive tends to lose some physical properties, like any other polymer that contains fillers. For example, when the VCI powder is added to the hot melt adhesive, the adhesive tends to lose "tack." Tack is an important property for laminations, both for "initial tack", which bonds the two surfaces together, and for the life of the laminate so the laminate does not delaminate over time during its life cycle. In order to make up for the loss of tack, one solution is to increase the amount of adhesive put into a laminate used to match a "similar" bond strength, that would be achieved with an unfilled adhesive. A suitable tackifier is Regalrez 1018 supplied by Eastman Chemical.

When the VCI adhesive is manufactured by a twin screw method, it is possible and preferable to add tackifying resins in screw zones downstream from addition of the VCI particles and coupling agents. In various embodiments, the tackifying resins are saturated hydrocarbon resins, hydrogenated synthetic polyterpenes, natural hydrogenated terpenes, and the like. Suitable tackifying resins are described for example in U.S. Pat. No. 5,204,390, the disclosure by which is incorporated by reference. Further suitable examples include hydrogenated aliphatic petroleum hydrocarbon resins, aromatic hydrocarbon resins, and hydrogenated derivatives thereof. If desired, mixtures of two or more tackifying resins can be added. Other suitable tackifying resins include hydrocarbon, (e.g. C5-C9) resins, polyterpenes, and rosin esters of pentaerythritol and glycerol. In various embodiments the tackifiers can be added to reduce viscosity and/or improve wetting.

In various embodiments, the adhesive compositions contain from about 1% to about 15% tackifying resin, from about 5 to about 10%, or from about 5 to about 7% tackifying resin, based on the total weight of the adhesive composition. In certain embodiments, the base adhesive used to formulate the compositions already contains a certain percentage of tackifying resin as part of the commercial product being used. In such embodiments, the downstream blending of additional tackifying resins is reduced by a corresponding amount.

The tackifying agent is preferably added downstream of the VCI particle, and is added at a relatively low shear for a relatively short time to avoid too high a degree of mixing or miscibility into the adhesive. It is believed that the relatively low degree of mixing of the tackifier leads to encapsulation of the particles in the composition, making the tackifier act as a shell. This tends to increase the pressure sensitivity of the adhesive (desirable for downstream use in lamination processes) while at the same time decreasing the viscosity or at least avoiding an unacceptable increase in viscosity, which is also desirable for downstream processing. In one aspect, the invention is characterized by an adhesive containing added tackifying agent (tackifier) that has a melt index or viscosity no higher than the adhesive before addition of the tackifying agent.

Foaming Agent

A foaming agent can be added to the adhesive composition. In the continuous process, the foaming agent is preferably added downstream of addition of the VCI particle and coupling agent. Alternatively, foaming agents can be added to the adhesive compositions in a continuous process during lamination or adhesive coating.

Foaming agents contain an active ingredient that produces a gaseous decomposition product when subjected to an activating temperature, which is a characteristic of the agent. In various embodiments, it is preferred to use a foaming agent that will not be activated during compounding in any of the stages described herein, but that will decompose to provide volatile blowing agent at a later temperature of lamination during which the adhesive composition is applied to a substrate. In a non-limiting embodiment, a foaming agent is selected that has a decomposition temperature of 140° C. or higher, for example from 140-150° C. A suitable foaming agent is Celogen® 780, an activated azodicarbonamide sold by Crompton and having a decomposition temperature of 140-150° C. It can be formulated in the continuous process described herein at temperatures below 140° C. in all the stages, and then subjected to temperatures of 140-150° C. in a subsequent lamination process to foam the adhesive.

Microspheres

Compounded adhesives described herein can further contain microspheres. In various embodiments, the microspheres are small spherical plastic particles. They can consist of a polymer shell encapsulating a gas. When the gas inside the shell is heated, the pressure inside is increased and the thermoplastic shell softens. The result is an increase in the volume of the microspheres. The microspheres can thus be used as lightweight fillers or as blowing agents. Suitable microspheres include those available under the Expancel™. The use of microspheres adds volume to the adhesive, allowing more area coverage with less adhesive. As a result, the use of the microspheres will also tend to lower the final weight of the laminate using the adhesive.

In a specific embodiment, a hot melt adhesive composition contains a thermoplastic copolymer adhesive, powder particles containing a carrier and further containing a vapor phase corrosion inhibitor, and a titanate functional coupling agent and/or a zirconate functional coupling agent. The composition preferably contains from about 0.01% to about 0.5% by weight of total titanium and zirconium measured on an elemental basis. In preferred embodiments, the powder particles have a non-volatile content of about 95% to about 99% by weight and have an average dimension less than 30 μm. The copolymer adhesive is a multiblock copolymer containing two or more blocks differing in one or more physical or chemical properties. In a non-limiting embodiment, the blocks are made by polymerizing ethylene and at least one copolymerizable monomer. Representative copolymerizable monomers are $C_{3-20}$ and $C_{4-20}$ olefins.

In one embodiment, a method of manufacturing a hot melt adhesive composition in multiple stages is provided. In a first stage, the method involves subjecting a hot melt adhesive to a first temperature above 120° C. while blending (stirring) at a first shear rate to melt the adhesive. The first stage provides a molten adhesive with sufficient flow parameters for further processing in later stages. The method further involves, in a second stage, increasing the shear to a second shear rate and reducing the temperature below 120° C., preferably below 100° C., and more preferably below 90° C. Preferably, the adhesive is shear sensitive so that increasing the shear rate reduces the viscosity to such an extent that suitable low viscosity can be maintained in the second stage even at a lower temperature. In a third stage, the method involves adding a powder to the adhesive while maintaining sufficient shear to maintain the temperature below 120° C., preferably below 105° C., preferably below 100° C., and more preferably below 90° C. Sufficient shear is maintained to provide adequate melt flow. The sheared mixture is subjected to mixing at the temperature for sufficient time to disperse the powder in the adhesive. Advantageously, the temperature of mixing is at a suitably low temperature, while proper mixing and/or flow is maintained from the applied shear. The powder contains a carrier and a vapor phase corrosion inhibitor. The temperature in the third and subsequent stages is preferably kept below a temperature at which the vapor phase corrosion inhibitor is lost or volatilized from the composition, and below a temperature at which the titanate or zirconate coupling agent is decomposed or otherwise rendered less effective. In some embodiments, this temperature is 105° C. or less. In a fourth stage, the method optionally and preferably provides for adding a tackifying agent to the adhesive composition containing dispersed VCE particles. The fourth stage addition of tackifying agent is carried at a suitably low temperature for a short time at a relatively low shear rate, for best incorporation into the adhesive to develop the best tack for further application in inline lamination processes or other uses. One or more additional components of an adhesive composition such as without limitation an optical brightener, a coloring agent, and an antimicrobial composition can be added into the adhesive in any of the stages noted.

In another advance over known methods, the method in various embodiments further involves adding a coupling agent in the third stage along with the VCI particles, wherein the coupling agent is selected from organotitanate compounds and organozirconate compounds. Mixtures of organotitanates and organozirconates can also be used. In various embodiments, the coupling agent is combined with the VCI particles ahead of time before the so-called "titanated" (or "zirconated") VCI particle is mixed into the adhesive in the third stage. In other embodiments, the coupling agent is fed into the adhesive separately from the VCI particles, and can be added at the same zone as the VCI or in zones upstream or downstream of the VCI addition. Advantageously, the relatively low temperature and high shear of the third stage provide for efficient mixing or exfoliation of the coupling agent in the adhesive/VCI mixture.

Advantages are provided in the methods by controlling the temperature in various stages of the process. For example, it is preferred to operate at a temperature above the melting point of the adhesive in the first stage, for example at a temperature of about 125° C. to about 150° C. In the fourth stage, it is preferred not to operate at too high a temperature in order to avoid possible volatilization of the vapor phase corrosion inhibitor, while at the same time operating at a high enough temperature to facilitate compounding of optional ingredients such as the tackifying resins and others. In a preferred embodiment, the method is carried out at a temperature of about 120° C. to about 130° C. in the fourth stage.

The third stage involving adding the powder to the adhesive and maintaining sufficient shear to disperse the powder is carried out at low temperature relative to the melting point of the adhesive. In preferred embodiments, the temperature in the third stage of mixing the powder is 100° C. or less, preferably at 90° C. or less. In various embodiments, the temperature during the third stage of adding the powder and mixing the powder into the adhesive is carried out at a temperature of 80° C. or less. It is to be understood that when the temperature is 100° C. or less, 80° C. or less, and the like, that the temperature is also maintained sufficiently high to achieve acceptable melt flow. For this, the temperature is preferably maintained at 50° C. or higher, preferably at least 60° C. or at least 70° C. Flow is maintained at the lower temperatures by increasing the shear, where upon the pseudoplastic or shear sensitive adhesive material is reduced in viscosity, for example in a twin screw apparatus.

Continuous versions of the processes described herein can be implemented in extrusion apparatus. Operation of screws in an extrusion apparatus provides for mixing and transport of the composition while it is being compounded in various zones or stages that occur at various places along the barrel of the extruder. Single screw extrusion apparatus can be used, but it is generally preferred to use a multiple screw extruder such as a twin screw extruder to achieve the most efficient mixing and compounding of the adhesives. Co-rotating screws (intermeshed or not) are commonly used for such compounding. For general background on extrusion, attention is directed to the *Plastics Engineering Handbook*, Fifth Edition, edited by Michael L. Berins and published by the Society of the Plastics Industry, Inc., for example at page 91ff.

In a particular embodiment, a method of compounding an adhesive composition in an extruder such as a twin screw extruder is provided. In one aspect, this involves implementation of the various stages of a continuous process in a twin screw extruder apparatus. The method involves melting a hot melt adhesive and introducing the molten hot melt adhesive into the barrel of the extruder. The hot melt adhesive is preferably a thermoplastic block copolymer. After introduction into the barrel, the melt is cooled below 90° C. while increasing the shear in the barrel to maintain sufficient melt flow. When the lower temperature of 90° C. or less is reached, a titanate and/or zirconate coupling agent is added to the melt at a temperature of 90° C. or below. Also at a temperature of 90° C. or lower, a vapor corrosion inhibitor is added to the melt in particulate form. Alternatively, the VCI particles added in the third stage are pre-coated with the titanate or zirconate coupling agent. The blend of a hot melt adhesive, vapor corrosion inhibitor, and titanate and/or zirconate coupling agent is then blended at a temperature of 90° C. or less (in various embodiments, at 80° C. or less) until the particles are dispersed in the hot melt adhesive. The vapor corrosion inhibitor in particulate form is preferably provided in the form of a powder that contains a carrier and an amine corrosion inhibitor, by way of non-limiting example.

As noted, it is desirable to maintain the temperature below 90° C. during the blending of the coupling agent, the adhesive, and the vapor corrosion inhibitor in particulate form. In representative embodiments, the temperature is maintained at a temperature of about 50° C.-80° C. Thus, in various embodiments, the methods involve adding the titanate or zirconate coupling agent to the melt at a temperature of 50° C.-80° C. and blending the adhesive, the vapor corrosion inhibitor, and the coupling agent at a temperature from 50° C.-80° C.

Melting the adhesive is preferably carried out at a temperature of 120° C.-160° C.

After low temperature blending and dispersing of the vapor corrosion inhibitor in particulate form into the melt in the presence of the coupling agents, the temperature can be raised if desired to add further components. In a non-limiting example, after the particles are dispersed in the hot melt adhesive, the process involves continuing to provide shear at a temperature of 80° C.-130° C. and adding other components. Non-limiting examples of further components include tackifying agents, coloring agents, and antimicrobial composition.

It is preferred to add the coupling agents during the process at a level to provide a total level of titanium and zirconium at a level of 0.05%-5% or 0.1%-5% by weight on an elemental basis.

The coupling agent and the vapor corrosion inhibitor (VCI) particles can be added into the screw extruder in separate additions, or as a single addition. Thus, in one embodiment, the VCI and the coupling agent are added separately. In another embodiment, the coupling agent and the VCI are added together into the extruder. In a particular embodiment, the VCI and the coupling agent are first combined in a separate step, with the combination then being added to the melt in the extruder, preferably at a temperature below 90° C. It is believed that by combining the coupling agent and VCI particles, the organotitanate or organozirconate coupling agent is substantially disposed on the surface of the VCI particles. Advantageously, the extruder process and other processes described herein involve blending or exfoliating the VCI powder particles at low temperatures to provide efficient dispersion of the particles in the adhesive, while at the same time avoiding high temperatures that would degrade the quality of the particles and/or lead to premature volatilization of the amine corrosion inhibitor from the composition.

When the continuous process is implemented in an extrusion apparatus, the temperature and shear conditions in the respective extruder zones during the first, second, third and fourth stages are achieved and controlled using known techniques in the extrusion field. Temperature, for example can be controlled with heating jackets placed along the length of the extruder in conventional fashion. The shear conditions and the amount and rate of mixing in the stages can be accomplished by selecting suitable screw designs and operating conditions in various zones of the extruder. Shear can be determined by the design of the screw threads including pitch, height, and distance peak to peak. It can also be obtained by selecting screw parameters such as speed, counter-rotation (for twin screw extruders), and the like. The degree of mixing and shear is also a function of screw design and operation parameters. The time of mixing in each of the stages is determined by such parameters as screw speed, design of the screws, and length of the extruder in which the individual steps or stages are carried out. Relative mixing and retention times in each of the stages is determined in-part by the length of barrel (corresponding to various "zones" of the extruder) in which the noted screw design and operating conditions are implemented. Further description of extruder technology is provided in treatises such as *Mixing and Compounding of Polymers*, Manas-Zloczower et al., Eds. (Carl Hanser Verlag, 1994) and *Functional Fillers for Plastics*, Xanthos, ed. (Wiley, 2005), the disclosures of which are useful as background information and are hereby incorporated by reference.

It is preferred to add a tackifying agent, if needed, in a fourth stage that is carried out after the VCI and coupling agent added to the adhesive. When the process is implemented in extruders, the fourth stage takes place in the extruder "downstream" of the third stage. When a tackifying agent is thus added, preferably it is added with a relatively low amount of shear and mixing compared to some of the other stages. One way to accomplish the low amount of mixing is to carry out the stage in a length of barrel that is short relative to other steps. In a non-limiting example, the fourth stage of adding a tackifying agent with low mixing is carried out at the end of the extrusion barrel just before exiting the extruder. The length of mixing in the fourth stage is determined by the length of the barrel in which the mixing takes place. To illustrate, the mixing in the fourth stage takes place in a zone that has a length from 5% of the total barrel length to 25% of the total barrel length. This provides for a relatively short mixing time, which is preferred for best development of tack from the tackifying agent. In addition, the shear conditions in the fourth stage are mild compared to some other stages. The amount of shear in the fourth stage (determined by screw parameters) and the residence time (determined by barrel length) can be varied to achieve optimum incorporation of the tackifying agent.

In various embodiments, advantages are achieved through advances in the adhesive used as described herein. The adhesive is part of an adhesive additive delivery system (AAD). The AAD system contains a vapor corrosion inhibitor (VCI) as described herein. Further aspects of the adhesive will now be described.

5. Film

The laminate has a shrink stretch film in addition to the non-woven fabric discussed above. The film is used in conjunction with the nonwoven fabric to provide a laminate structure that provides for transport of water vapor from the inside protected space or object to the outside environment. Suitable films include those with a water vapor transmission rate above about 30 grams per square meter per day, along with sufficient strength to provide shrink or stretch wrap protection.

The film is fabricated at suitable thickness for the intended application. For various applications, the film has a thickness of from about 1 to about 12 mils. Indeed, most of the strength of the laminate comes from the film, while the thickness is related to the strength of the film. Preferred ranges for shrink film include 2-10 mils or 3-9 mils. for stretch applications, lower thicknesses are preferred to provide for the ability to stretch the film readily, if necessary by hand. In a non-limiting example, laminates for stretch applications are provided where the film is 1-3 mils thick or about 1.5 mils thick.

The film can be a monolayer construction, but in various embodiments, the film has at least three individual layers. In preferred embodiments, each layer is made up or ethylene co- or homopolymers. For shrink applications, the film is characterized as a low modulus amorphous film that has post—shrink elasticity. A suitable amorphous film is characterized by less than 50% crystallinity, wherein crystallinity is determined in the conventional way by density measurements. In various embodiments, amorphous film is characterized by crystallinity less than 40%, 30%, 20%, and less than 10%. The film and fabric come together at an interface, preferably with an adhesive to provide intermittent bonding at the interface. The interface layer of the film (or the sole layer of a monolayer film) can be corona treated as desired to improve adhesion to the fabric.

The layers of the film are constructed so that when they are combined with the fabric in the laminates described herein, water carried to the interface by the capillary action and hydrophilic nature of the fabric will be attracted to the first layer of the film (the "first" being defined as the layer closest to, i.e. adjacent to, the interface) and drawn successively to second and third layers of the film ("second" and "third" layers of the film are given in order of distance from the interface and from the "first layer"; the second layer is adjacent the first, the third is adjacent the second, and so on) until the water vapor escapes from the wrapping material. The construction of the film provides for a "one-way" transport of water vapor away from the object being protected, through the film and into the surrounding environment. In one implementation, the layers of the film have increasing hydrophilic properties as the distance from the interface increases.

The "one-way" path for water vapor through the film is indicated if the water vapor transmission rate measured in one direction through the film is higher than the rate measured in the other direction. Alternatively or in addition, the relative hydrophilicity of the film layers (i.e. increasing hydrophilicity from the interface layer to the outside skin layer) is indicated by conventional hydrophilicity measurements such as the contact angle of a sessile or pending drop of water on the respective surface. Higher hydrophilicity is measured as a lower water contact angle.

A preferred construction of the multilayer film is A-B-C, where layer A of the film meets the fabric at the interface (A is the "first" layer) and layer C is exposed to the environment (C is a "skin layer"). The hydrophilicity of the individual layers is in the order C>B>A. In a preferred embodiment, layers A, B, and C (and others if present) are made largely of polyethylene or of ethylene copolymers with a majority of ethylene subunits.

The film layers preferably contain particle fillers such as calcium carbonate ($CaCO_3$) and titanium dioxide ($TiO_2$). To increase the physical properties of the filled polyethylene films, the particle fillers are alloyed to the polyethylene by means of crosslinking agents. A preferred crosslinking agent is the titanate coupling agents such as those used in the adhesive, discussed above.

Polyethylene film has a relatively low vapor transmission rate and is inherently hydrophobic. The addition of hydrophilic fillers such as those obtained by modifying calcium carbonate and/or titanium dioxide with hydrophilic titanates increases the hydrophilicity a slight amount, but more is required for suitable performance in most laminate applications.

For this reason, the polyethylene films also contain compositions called "ionomers" that, when alloyed into the polyethylene matrix, increase the water vapor permeability of the film. Chemically, the ionomers are polymeric materials that contain carboxylic acids at least partially neutralized with a metal such as potassium or sodium. Examples include neutralized ethylene/acrylic polymers that also contain neutralized carboxylic acids. The neutralized carboxylic acid groups in the ionomers contribute to the passage of water through the film, even though the film itself is not porous.

As noted, the coupling agents (e.g. titanates, zirconates, silanes) are added in part to couple the particle fillers to both the polyethylene matrix and the backbone of the polymeric ionomers.

In this way, each layer of the film is a "alloy" of two or more polymers. In preferred embodiments, the alloying in the film layer is evidenced by there being a single thermodynamically measured endotherm as the film is subjected to rising temperature in a test such as a differential scanning thermometry (DSC). In this regard, an alloy is considered to be a blend of polymers wherein the blend contains a component that holds the two polymers together. In various embodiments, the titanates perform this coupling action.

An advance and innovation is that the titanates used to couple the ionomers, the fillers, and the polyethylene are in particular hydrophilic titanates. The titanate coupling agents also contribute to the hydrophilic nature of the resulting films. Two examples of hydrophilic titanates available from Kenrich Petrochemicals are LICA38J and NZ38J.

In preferred embodiments, the film of the laminate is strong enough to seal an article when it is shrunk wrapped and resists tears, punctures, and the like. Normally ionomer films are too weak for outdoor use as in shrink stretch or wrap application. However, the film application is strengthened in at least two different ways.

First, the coupling agent binds the filler particles to the polymeric components of the film and increases the strength. Secondly, the films preferably contain a crosslinking agent to further strengthen the film and to improve lamination strength between film layers. A preferred crosslinking agent is a polymer that contains epoxy groups. In one embodiment, "Elvaloy®" material is a crosslinking agent. The Elvaloy® used in this embodiment is a copolymer of ethylene and glycidyl methacrylate. The Elvaloy® material provides a crosslinking, which together with a titanate coupling adds the strength to the film.

Differences in hydrophilicity between the film layers can be achieved in many different ways. For example, the amount of high vapor permeable resin in each layer can be varied, where all else being equal a higher level of the resin corresponds to a layer with a higher hydrophilicity. The thickness of individual layers can also be varied, where all things equal a thinner layer will have a higher rate of vapor transmission. The amount of hydrophilic/hydrophobic additives (such as the hydrophilic fillers prepared by treating with hydrophilic coupling agents such as titanates) in a layer can make a difference in the permeability of an individual layer as well as the overall film.

In these ways, films are provided where a first side has a lower hydrophilicity than a second side. The difference in hydrophilicity of the two sides of the film can be observed by testing the contact angle on opposite sides of the film; the more hydrophilic side will exhibit a lower contact angle. The preferred direction of vapor through the film can also be tested by measuring the water vapor transmission rate through the film or laminate in both directions, and observing that the rate is higher in the "inside to outside" direction (see FIG. 7a).

The film further aids water removal. After condensed water is wicked up and pushed away from the surface to be protected and reaches to the interface of the fabric, adhesive, and film, it will eventually vaporize through the thick film.

In various embodiments, it is preferred that the film layers be made out of the same polymer as used for the non-woven fabric and/or for the adhesive composition. In a preferred embodiment, the film layers are predominantly made of ethylene homopolymers and copolymers such as LDPE, LLDPE, EMA (maleic anhydride grafted ethylene co-polymers), EVA (ethylene vinyl alcohol copolymers) and ionomers, where the homo- and co-polymers preferably make up the matrix of the film layers. The ethylene polymers and copolymers used in the structure can be made by any well known method in the industry: Ziegler-Natta catalyst polymerization, metallocene catalyzed polymerization, Versipol® catalyzed polymerization and by free radical polymerization. The film structure is also normally pigmented for improved UV blocking, and has enough primary and secondary antioxidants, UV stabilizers for processing and long term outdoor usage. In most cases, a filler such as $CaCO_3$ is used to carry additional additives (titanates, zirconates), and/or add improved structural properties. A masterbatch that combines all the above mentioned pigments, additives, stabilizers and fillers can used to help disperse these chemistries evenly throughout the polymer.

Linear polyethylene can be made by copolymerizing ethylene with $\alpha$-olefins such as butylene, hexene or octene to decrease the density and produce ultra low density polyethylene (ULDPE) or very low density polyethylene (VLDPE), which can be used to provide improved toughness, impact strength, puncture resistance, seal properties, and cold weather properties. Use of LLDPE as stretch film has been established with patents similar to U.S. Pat. No. 5,617,707 the teachings of which are hereby incorporated by reference. ULDPE and VLDPE are commercially available. Some ethylene co-polymers can also be acid modified. Non-limiting examples include EXCEED™ (mVLDPE) from ExxonMobil, ATTANE™ (ULDPE) family from The Dow Chemical Company, and anhydride modified LLDPE PX3084 from Plexar®. Unless context dictates otherwise, the term "LLDPE" includes varieties of the ethylene polymer family including but not limited to: ULDPE, VLDPE, and mVLDPE. HDPE can be used in the film formulations, but only at a reduced level, as otherwise it would be expected to contribute too greatly to the crystallinity of the film and would lower the vapor transmission rate of the film.

The matrix resin made of LLDPE is preferred to be from 50%-95%, or more preferred to be from 55%-90%, or most preferred from 60%-85% by weight of the all polymers in the overall film layers. In this way, the overall matrix polymer of the film will be the ethylene polymers.

In various embodiments, an outside skin layer of the film can employ from 5%-45%, or more preferred from 10%-40% or most preferred from 15%-35% by weight of an LLDPE composition as discussed above.

It is desired that LLDPE is the matrix resin of the overall film structure and it is also desired to be rendered hydrophilic by addition of hydrophilic titanates delivered by a masterbatch. This way LLDPE, which usually has a very low level of water vapor transmission rate, can also help improve the overall water permeability as well as increasing physical properties by being coupled with the fillers such as ($CaCO_3$) that delivered it.

6. Ionomers

As noted, the film layers normally contain ionomers to render them more hydrophilic, so that the layers are permeable to water vapor.

In one aspect, ionomers contain ionic domains that are made up of aggregates of pairs of neutralized acid salts of metal cations. Because the acid groups are attached to the polymer chains, the ionic domains act as cross-linking sites in the solid state and therefore provide the vast variety of distinctive properties of ionomers. Films containing such ionomers have PE-crystalline regions, amorphous regions, and cross-linked ionic domains.

In one embodiment, the ionomers are alkali metal salts of polymers that contain carboxylate groups. A suitable percentage of the carboxylate groups is neutralized (in exemplary fashion 30% or more, 40% or more, 50% or more, 60% or more, 70% or more, 80% or more, 90% or more, up to 100% or essentially 100% neutralized) with alkali metal, with sodium and/or potassium being most common. In various embodiments, 10-90% or 40-75% of the carboxylate groups are nominally neutralized.

Suitable polymers include those based on polymerization of acrylic acid, methacrylic acid, maleic anhydride or other $\alpha,\beta$-unsaturated carboxyl monomers with comonomers. Comonomers include olefins (e.g., ethylene, propylene), (meth)acrylate esters, acrylonitrile, styrene, and so on. Non-limiting examples of polymers include EAA (ethylene acrylic acid copolymer) and EMAA (ethylene-methacrylic acid copolymer).

The so-called fatty acid salt modified ionomers (FAMI) are preferred in some embodiments for combination with polyethylene in the film layers. They are described for example by DuPont in "Journal of Plastic Film and Sheeting: Development New Ionomers with Novel Gas Permeation Properties". When potassium is the counterion, the ionomers are referred to as FAMI-K. FAMI-K ionomers contribute a high moisture permeability to the polymer with which they are blended. This high water vapor permeability is a result of favorable interactions between the hydrophilic potassium carboxylate and the water molecule.

If the counterion of the FAMI is a sodium (Na) then the ionomers are known as FAMI-Na. If at least about 50% of the neutralizing cations are Na, then the water vapor permeability becomes a function of the relative humidity in the environment. The polymer blend then acts as a water barrier if the relative humidity percent (RH) is less than about 50%, and above about 50% or above about 60% RH it acts as a breathable polymer.

More description of various suitable ionomers is presented in U.S. Publication Nos. 2007/0287019 A1 and 2007/0283652 A1 which are hereby incorporated by reference.

In various embodiments, unmodified ionomers comprise one or more E/X/Y copolymers nominally neutralized with alkali metal, most commonly sodium and/or potassium.

The fatty acid modified ionomers contain one or more E/X/Y copolymers and one or more organic acids or salts thereof with a fraction of carboxylate groups being modified or neutralized with an alkali metal.

In E/X/Y copolymer, E is derived from ethylene, X is derived from at least one $C_3$ to $C_8$ $\alpha,\beta$-ethylenically unsaturated carboxylic acid, and Y is derived from a softening comonomer, or ionomers of the E/X/Y copolymers. X is from about 2 to about 35, 4 to 25, or 5 to 20 weight % of the E/X/Y copolymer and Y is from 0 to about 35, about 0.1 to about 35, or 5 to 30 weight % of the E/X/Y copolymer.

The E/X/Y copolymers are acid copolymers or "direct" acid copolymers. They include an $\alpha$-olefin, such as ethylene, copolymerized with at least one monomer derived from a $C_{3-8}$ $\alpha,\beta$-ethylenically unsaturated carboxylic acid. The acid copolymers can be described as E/X/Y copolymers where E is ethylene, X is derived from at least one. $\alpha,\beta$-ethylenically unsaturated carboxylic acid, and Y is a softening comonomer. "Softening" means that the crystallinity is disrupted (the polymer is made less crystalline). Notable are E/X/Y copolymers wherein Y is 0 weight % of the polymer. They may optionally contain a third softening comonomer.

Examples of X include unsaturated acids such as (meth)acrylic acid, maleic acid, fumaric acid, and itaconic acid; and monoesters of fumaric acid and maleic acid (maleic half esters) including esters of $C_1$ to $C_4$ alcohols such as for example, methyl, ethyl, n-propyl, isopropyl and n-butyl alcohols.

Examples of softening comonomers for use as Y include alkyl acrylate, alkyl methacrylate, or combinations thereof wherein the alkyl groups have from 1 to 8, or 1 to 4, carbon atoms.

Ethylene acid copolymers with high levels of acid (X) can be produced by any methods known to one skilled in the art such as use of "co-solvent technology" disclosed in U.S. Pat. No. 5,028,674 or by employing somewhat higher pressures than those at which copolymers with lower acid levels can be prepared.

Specific acid copolymers include ethylene/(meth)acrylic acid copolymers. They also include ethylene/(meth)acrylic acid/n-butyl(meth)acrylate, ethylene/(meth)acrylic acid/isobutyl(meth)acrylate, ethylene/(meth)acrylic acid/methyl (meth)acrylate, ethylene/(meth)acrylic acid/ethyl(meth)acrylate terpolymers, or combinations of two or more thereof. Other acid copolymers include ethylene/maleic acid and ethylene/maleic acid monoester dipolymers; and ethylene/maleic acid monoester/n-butyl(meth)acrylate, ethylene/maleic acid monoester/methyl(meth)acrylate, ethylene/maleic acid monoester/ethyl(meth)acrylate terpolymers, or combinations of two or more thereof.

The unmodified ionomers can be mixed with organic acids or salts thereof to prepare acid modified ionomers. Alternatively, X/Y/Z polymer and organic acid can be combined and modified or neutralized with alkali metal. Suitable ionomers include those denominated as FAMI-Na and FAMI-K.

The organic acids can be monobasic, dibasic, or polybasic carboxylic acids having fewer than 36 carbon atoms, or salts thereof and can be present in the composition from about 1 to about 50 weight %. The acids are optionally substituted with from one to three substituents independently selected from the group consisting of $C_1$-$C_8$ alkyl, OH, and $OR^1$ in which each $R^1$ is independently $C_1$-$C_8$ alkyl, $C_1$-$C_6$ alkoxyalkyl or $COR^2$; and each $R^2$ is independently H or $C_1$-$C_8$ alkyl.

In various embodiments, greater 70% or more, 80% or more, 90%, or even 100% of acidic groups in the E/X/Y copolymers and organic acids are nominally neutralized with metal ions. When the metal is potassium, the resulting film has high water vapor permeability that is not dependent on the relative humidity to which the film is exposed. When the counterion is sodium (or at least 50 mole % sodium ions), the moisture permeability (and the water vapor transmission rate) is a notable function of the environmental relative humidity. When the relative humidity rises above 50%, the so-called FAMI-Na progressively increase its moisture permeability to become a high moisture transmitter. In various embodiments, the FAMI-Na are poor vapor transmitters below about 50% RH, and significant vapor transmitters at about 60% RH or above.

In contrast to the application described in the above publications for ionomers, the films of the laminate described herein are heavier gauge, with higher requirements of tensile strength (e.g., 5,000 psi) and tear strength (e.g. above 3,000 g). In addition, the films of the laminate normally require a higher degree of UV stability so as to be able to withstand up to 4 years or more of outdoor exposure.

In various embodiments, the laminate and in particular the film integrate the FAMI-Na and FAMI-K Ionomer technology, either separately in each layer or together in the same layer. It is used on the skin layers or in case of co-extruded films where there are more than three layers, it can be used on layers adjacent to the skin layers. Incorporation of the ionomers contributes to the shrink properties and in particular can provide a desired 2:1 (MD/CD) shrink ratio. FAMI-Na and FAMI-K ionomers or a blend of the two preferably make up 5%-45%, 10%-40%, or 15%-45% by weight of the polymers in non-skin layers.

On skin layers, or an adjacent layer to the skin layers (if the co-extrusion is more than 3 layers), the K-Ionomers can be 5%-90%, 10%-80%, or 15%-70% by weight of the layer.

In some cases, where fine tuning of water permeability, shrink, and/or 2% secant modulus is required, either the FAMI-Na or the FAMI-K ionomers can be substituted or blended with LDPE or LDPE co-polymers including acid modified co-polymers such as EVA and EMA.

In certain embodiments, films are provided that contain three or more individual layers, each of which contains a fatty acid modified ionomer. When the fatty acid modified ionomers are neutralized in part with sodium ions they are called FAMI-Na; when the neutralizing cation is potassium the ionomers are referred to as FAMI-K. In some embodiments, individual film layers contain FAMI-K or FAMI-Na, or combinations of both as ionomers in the individual film layers. In this regard, the FAMI-Na ionomers are considered as smart vapor barrier ionomers and provide vapor permeability that is humidity reactive. On the other hand, the FAMI-K ionomers provide high moisture permeability relatively independently of relative humidity conditions. It is preferred to use the humidity reactive ionomers in any of the layers of the coextruded film, while it is preferred to use the high moisture permeability FAMI-K kinds of ionomers only in the middle layer of the coextruded film.

In an exemplary embodiment, a three layer film is provided that contains a first layer containing 20-30% of the smart vapor barrier ionomer (FAMI-Na) in a first layer. The middle film layer contains about 30% by weight of the high moisture permeability ionomer (FAMI-K), and the third layer contains about 40% by weight of the smart vapor barrier ionomer. This demonstrates the use of the high moisture permeability ionomer in the middle layer of the coextruded film.

Alternatively, the three layers of a coextruded film can each contain a smart vapor barrier ionomer, but at increasing levels from the interface layer to the outside layer of the film. In one embodiment, the inner layer contains 30% by weight ionomer, the middle layer contains 40% by weight ionomer, and the outside layer contains 50% by weight ionomer. In another exemplary embodiment, the inner layer contains 20% by weight ionomer, the middle layer contains 30% by weight ionomer, and the outer layer contains 40% by weight ionomer.

In certain embodiments of three layer films, the individual layers are approximately the same thickness, building up to a preferred thickness of about 1 to 12 mils for the film. In other embodiments, the interface layer and outside skin layer are thinner than an inside or middle layer. In a non-limiting example, the outside layers make up 10-30% each of the thickness of the film, while the middle layer makes up 40-80-% of the thickness. In some embodiments, the inside layer is unpigmented and the outside layer is more hydrophilic because it contains pigment particles (e.g. $TiO_2$) treated with a titanate, zirconate, or silane coupling agent to render them hydrophilic.

The multilayer films can be formed by coextrusion of three or more compositions from a multi-head extrusion apparatus. Each of the screws of the extrusion apparatus is fed by a variety of gravimetric feeders. In one example, four different gravimetric feeders feed each of the screws of the coextrusion apparatus. A first feed contains the ionomer. A second feed contains the matrix polymer, for example, LLDPE. A third feeder adds a masterbatch. The masterbatch contains a variety of other ingredients such as the filler, color, UV package, and the like, along with a carrier resin and other optional ingredients. Optional ingredients in the masterbatch include the epoxy functional polymers and maleic anhydride grafted polymers described herein. The filler particles can be calcium carbonate, titanium dioxide, or other suitable filler. In some embodiments, the filler particles are coated before being added to the masterbatch with a hydrophilic titanate, zirconate, or a silane coupling agent. The carrier resin of the masterbatch can be a higher melt index LLDPE, or can consist of the epoxy functional polymer if it has a high enough melt index. A fourth gravimetric feeder can supply another masterbatch or, in a preferred embodiment, can feed an epoxy functional polymer separately as a strain.

Together, the first and second feeders provide material that makes up at least 80% preferably and at least 90% by weight of the film composition.

In one embodiment, the layers of the film are co-extruded in a blown film process, which is known in the art. As the molten film layers emerge from a circular die, they are immediately inflated by air pressure. External air is blown against the outside of the bubble to control the rate of expansion. Downstream, nip rolls pinch off the inflated tube while a cutter slits the tube into two sheets that are taken up on wind up rolls. By this process, the film can be simultaneously stretched in the machine direction (MD) and the transverse direction (TD).

In another embodiment, the multilayer film is stretched by tentering in a cast application. From a film die, the multilayer film passes over a quench roll. After reheating, the film passes through nip rolls that stretch the film in the machine direction. then the film is passed through a tentering process that stretches the film in the transverse direction before taking up the stretched film on a wind up roll.

However prepared, the stretched multilayer films have good lamination strength and resist delamination. The strength of lamination is believed to be due in part to the presence of the epoxy and/or maleic anhydride functional polymeric components in the film layers.

7. Additives, Fillers and Coupling Agents

The film layers can also contain fillers. Fillers are components of many multiphase composite structures; they usually form the minor dispersed phase in a polymeric matrix. They are generally used for cost reduction and/or for added mechanical properties.

The fillers used in the films can be without limitation mica flakes, nano-clays, nano-tubes, talc, wollastonite, foaming agents, microspheres, molecular sieves and $CaCO_3$. In various embodiments, the film layers are pigmented. Suitable pigments include inorganic pigments such as titanium dioxide, which also acts as fillers in the film compositions. In various embodiments, the filler makes up 0%-45%, 10%-40% or 15%-35% by weight in the overall film structure.

Molecular sieves are materials with precise and uniform size pores used as an adsorbent for gases and liquids. Non-limiting examples of molecular sieves include clays, porous glasses, zeolites, active carbons and aluminosilicate minerals. The size of the pores determines which molecules can pass through and which cannot. For water vapor transport a pore size of about 3 Å to 4 Å are preferred. In various embodiments, molecular sieves are incorporated at different loadings in the separate layers of the multilayer film to create directional flow towards the outside of the laminated product, i.e. away from the interface with the fabric.

Calcium carbonate is used to improve stiffness, impart impact resistance and tear strength. Fillers such as $CaCO_3$ also function as "heat sinks". These additives reduce the specific heat of resulting compositions, allowing less heat to be applied during a subsequent shrinking process, which in return protects both the nonwoven on the inside, and the surface from any extra heat damage.

It is preferred that the fillers, like calcium carbonate, added to the film structure be pre-coated or modified by a coupling agent. Suitable silane, titanate, and zirconate coupling agents are disclosed in the discussion of the adhesive herein. The coupling agents such as silanes and titanates improve compatibility and potential miscibility between the fillers and the polymers. They also tend to prevent a loss of physical properties that would otherwise occur because of high loadings of filler in the polymer matrix, or because of the presence of the ionomers added to increase vapor permeability.

When titanates or zirconates are used, the titanate coupling agents are 0.01%-7%, 0.05%-3% or 0.1%-0.5% by weight of the filler, in non-limiting embodiments and between 0.01%-7%, more preferably to be 0.05%-3% and most preferably between 0.1%-0.8% by weight of the polymer matrix. Unlike most applications using calcium carbonate fillers in polyolefins, the laminate film preferably has a hydrophilic coating for the filler particle. Lica38J (Kenrich Petro Chemicals, NJ, U.S.A.); is an example of a hydrophilic coating that renders both the filler and the polymer matrix hydrophilic.

In a preferred embodiment, the films are formulated to contain suitable levels of so-called titanated pigment particles. In an illustrative embodiment, particles of titanium dioxide are pre-treated or coated with a hydrophilic titanate or zirconate coupling agent, selected from hydrophilic coupling agents listed above for use in the adhesive composition. The presence of the coupling agent on the pigment particles aids in blending of the pigment into the polymer matrix. The coupling agent also leads to a significant increase in the strength of the film, which otherwise would be relatively weak due to the presence of the ionomers that provide for vapor transmission. In various embodiments, the film compositions contain more coupling agent material (such as the hydrophilic titanates and zirconates) than can be added by coating the pigment particles. Such additional material can be added by masterbatch methods during formulation of the film compositions.

In a particular embodiment, additional coupling agent is provided by pre-coating $CaCO_3$ particles with a silane or titanate—from this point on, for definition purposes a titanate coated $CaCO_3$ will be referred as $CaCO_3(T)$—and formulating the coated calcium carbonate particles into a masterbatch for better delivery at the time of film production. During the masterbatch process it is desired that $CaCO_3(T)$ not reach the Initial Boiling Point (IBP) of the coupling agent. Therefore it is desired that the carrier resin of the masterbatch be compatible with the matrix polymers being used, as well as have low melt temperature for a safer compounding. In a non-limiting example, the masterbatch contains $CaCO_3(T)$, low melt polyolefin and/or a acid modified polymer and LLDPE or its copolymers. In an example, $CaCO_3$, carrying a coupling agent(s) such as—LICA38J with IBP at 104.5° C. (220° F.), is blended with a low melt polymer such as Elvaloy® PTW by E.I. du Pont de Nemours and Company Inc.; with a melting point at 72° C. (162° F.) initially in a twin-screw compounder. Once the initial dispersion of the titanate coupling agent takes place with the low melt polymer, the temperatures can be taken up to a more desirable production temperature where a stronger, high melt polymer—for example ATTANE 4404G—is added. As a result, the masterbatch has a filler ($CaCO_3$), a coupling agent (Titanate), a low melt initial carrier (Elvaloy® PTW) and a high strength polymer (ATTANE 4404G) that will help compatibilize the whole polymeric structure. It is desired that the masterbatch melt index (MI) be 0.5-2.0 above that of the matrix resins for better dispersion during the film manufacturing.

Most films require some type of an antioxidant and/or a UV protective chemistry to keep the polymers stable in manufacturing conditions. In most cases such chemistries are delivered to the film in masterbatch format, where the masterbatch is made up of a carrier resin (suitable resins include LLDPE, LDPE, HDPE and PP), pigments (if it is colored film), and the protective chemistries such as the antioxidants (AO) mentioned above. If desired the masterbatch carrying the filler and the coupling agent can be added to this package so that there is one masterbatch instead of two. The masterbatch should have a melt index number close to the melt index numbers of the polymers to be used in the film. In an example, the melt index is 0.5-2.0 points higher than that of the matrix resin, to help with its dispersion through the matrix resins. The masterbatch containing the pigment, primary and secondary antioxidants and UV stabilizers is preferred to be between 1% to 15%, more preferably; between 3% to 12% and most preferably between 5% and 10% by weight of the total structure.

Figure 1:
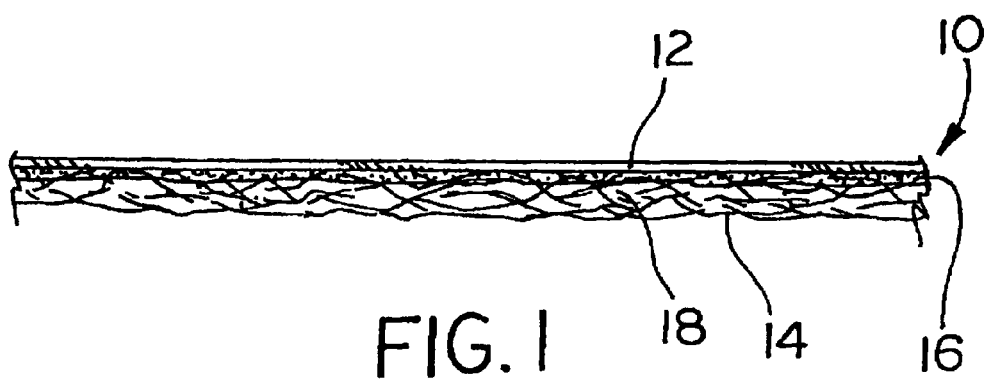
FIG. 1 is a cross-sectional view taken through the wrapping material according to the present invention before the material is shrunk around an article.
Figure 2:
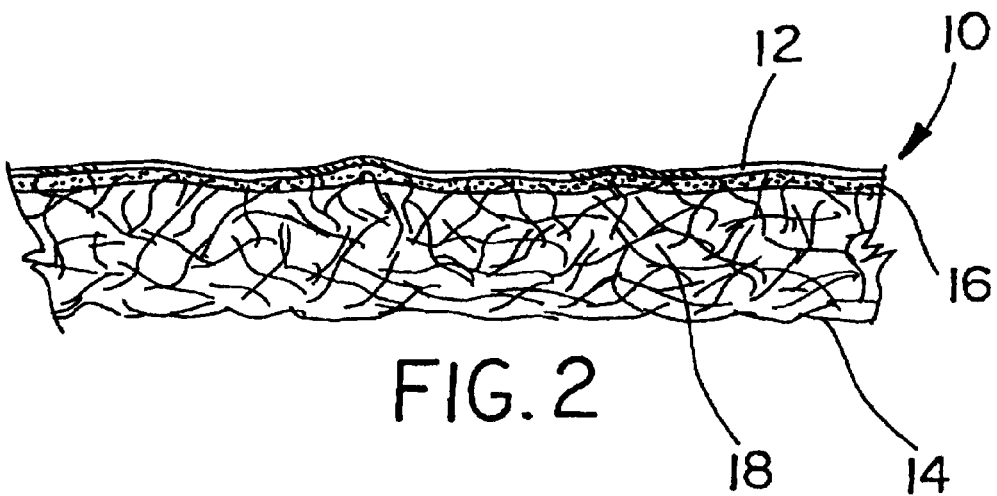
FIG. 2 is a cross-sectional view similar to FIG. 1 but illustrating the wrapping material according to the present invention after it is shrunk around an article.

Referring now to FIGS. 1 and 2 of the drawings, a laminate generally indicated by the numeral 10 made according to the present invention includes a film 12 consisting of a shrinkable, stretchable film which has a predetermined shrink response in response to heat applied to the film. A fabric 14 is secured to the film 12 by an adhesive layer generally indicated by the numeral 16.

Referring to FIG. 3, an article 19 wrapped by the laminate 10 divides itself into anodic regions 19a (carrying a negative charge as indicated in FIG. 3) and a cathodic region 19b (carrying a positive charge as indicated in FIG. 3). Rust and corrosion occurs as moisture entrained with the volume enclosed by the laminate wrapping material transfers charges between these regions. In the embodiment shown in FIG. 3, the film 12 of the laminate 10 acts as a barrier preventing the vapor corrosion inhibitor (VCI) within the adhesive 16 from emitting to the atmosphere. Accordingly, the VCI is emitted inwardly as indicated by the arrows A. The fact that the laminate 10 acts as a "one way emitter" conserves the VCI additive, and assures that it will only be used to protect the product 19. In various embodiments, the laminate 10 is shrunk around the products by applying heat, thereby causing the shrink/stretch film to shrink around the product, but the fabric 18 of the laminate 10 acts as a cushion between the film and the product to prevent the product from being damaged due to contact with the shrink/stretch film 12. When the laminate 10 is being shrunk around the product, the product is extremely vulnerable and most corrosion that occurs will occur when the product is initially wrapped and the humidity level within the wrapping is highest. The VCI additive is activated by humidity, acidity, and heat. Since the laminate 10 is shrunk around the product using heat, the VCI is initially heated upon wrapping. Accordingly, a high dose of VCI is emitted during the wrapping by the heat applied to shrink the material around the product. This high dose of inhibitor counteracts the moisture within the material. The VCI condenses on the product 19, and combines with the moisture to form a corrosion preventive salt which protects the material. Accordingly, after the moisture within the package is counteracted by the VCI, a molecular protective film is formed on all of the metal surfaces. The VCI within the adhesive 16 continues to emit after the initial high dose, but at a lesser level, for a limited period of time, which may be as much as two years. Accordingly, moisture within the package is continually counteracted by the VCI.

Figure 4:
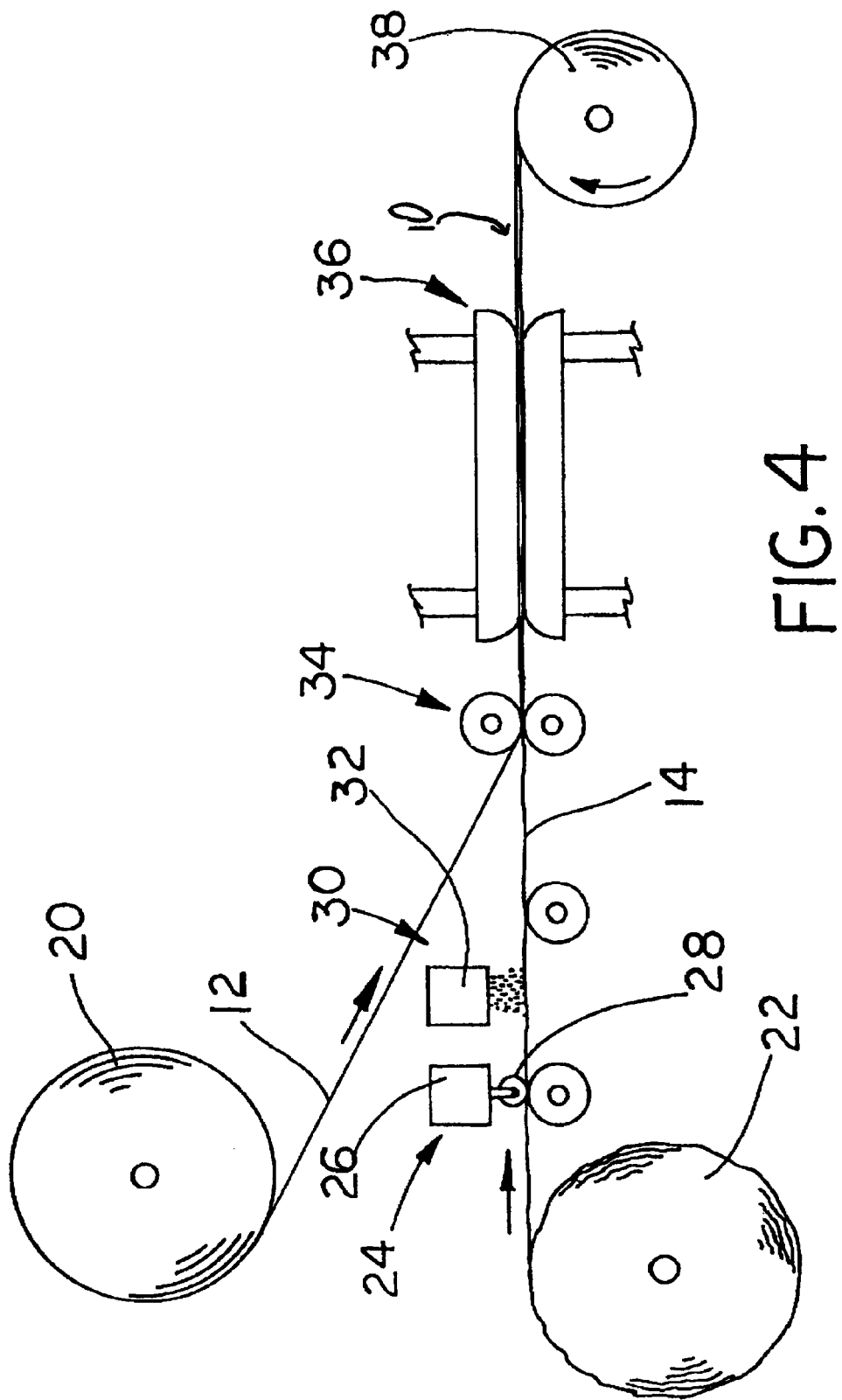
FIG. 4 is a schematic illustration of the manner in which the wrapping material according to the present invention is manufactured.

FIG. 4 illustrates an embodiment for making the laminate 10. In FIG. 4, a film 12 is fed from a roll 20 and a nonwoven fabric 14 is fed from a roll 22. The fabric 14 is fed through a gluing station 24 in which a hot melt adhesive is stored in a reservoir 26 and lightly applied to the upper surface of the fabric 14 by dispensing roller 28, in a manner well known to those skilled in the art. If the additive has not been mixed with the hot melt adhesive before it is placed in the reservoir 26, the additive is spread from a station 30 onto the upper surface of the fabric 14 at about the same place where the adhesive is dispensed. The additive is stored in a reservoir or container 32 and spread on the fabric 14 in any well known manner. The fabric 12, together with the nonwoven fabric 14 with the adhesive and additive, are fed through guide rollers 34 toward bonding station 36. Bonding station 36 is adjusted such that the film 12 is brought in touching engagement to the fabric 14 without substantial pressure being applied to either the film 12 or the fabric 14. Since the adhesive preferably does not wet through the fabric 14, bonding takes place only on a small percentage of the fabric and film 12. If the additive is mixed with the glue, the additive can be put in the adhesive up to 25% concentrations by weight without causing any substantial loss of adhesion or other properties. After passing through station 36, the laminate 10 is wound on a roll 38.

In non-limiting embodiments illustrated in FIGS. 5 and 6, the laminate 10 is particularly suitable for protecting large articles such as a van 40 (FIG. 4) or a motorcycle 42 (FIG. 5).

Shrinkable fabric can also be modified/designed for vacuum forming/thermoforming applications. In this application, the film side of the laminate can be heated as it moves through a heating tunnel. When the film is sufficiently softened, a vacuum can be used to draw it down to a mold (or reverse mold) and form it into a predetermined shape. The thermoformed laminate can be shaped to form a tray where a small part can be placed for shipment or storage. This application would work best if the mold is designed such a way that the final shape of the laminate would allow the nonwoven side to face the product being shipped. This method can be applied to both bulk packaging and individual packaging of items that require surface protection. Automotive and aerospace parts; or other vehicle parts that are of high value and/or that are likely to corrode during shipping or storage can be covered in the vacuum formed packaging. If the laminate uses an adhesive containing the VCI, the thermoformed package will provide corrosion protection as well.

The thermoformed package can provide a 360 degree protection in a similar fashion to clam shell packaging when the product being packaged is placed in between two vacuum formed laminates and sealed either by heat sealing, ultrasonic sealing or any other method used in the industry.

In various embodiments, a method of making a pre-formed cover fabric involves heating the laminate and forming to shape, as in vacuum forming.

If the product being packaged allows the package to be formed around the object itself by drawing the vacuum directly on the product—not having a premade mold/reverse mold—the laminate can be drawn directly down on the object being packaged thus eliminating further handling/packaging.

Non-limiting applications include vacuum formed containers for car parts such as disk brakes, shocks, mirrors, and the like; airplane parts; spacecraft parts; hand guns, other small weapons; laboratory equipment; small testing equipment; microscopes; cameras; medical equipment, and so forth. Methods of protecting such parts and equipment involve placing or storing the parts in a pre-formed cover fabric described herein, or in forming a package around the parts, for example by thermoforming, from the laminates described herein.

The laminate can be made into a bag or automated bag by folding and sealing the laminate. In this aspect, the shrinkable and/or stretchable laminate can be sealed by passing it through conventional A frame or other hot bar seal auto bag equipment, or it can be sealed employing ultrasonic or radio frequency (R/F) sealing technology. Fabrication of the bag is simplified when the laminate is made predominantly of a single polymeric material.

In various embodiments, items are protected by enclosing them in a bag or other enclosure that provides all around or 360° disclosure, completely isolating the item from the outside environment. In this embodiment, the laminate provides for one way transport of vapor from the inside of the bag to the outside, which lets the enclosed item dry in storage or transport. In a non-limiting example, hay or other agricultural crop is enclosed in such a bag for drying during transport or storage. When the item is ready for use, the laminate bag is removed and then either reused or recycled.

Advantageously, the laminates described herein are 100% recyclable because they are made predominantly from a single type of recyclable polymeric material, most commonly polyethylenes. In various embodiments, a method of recycling a wrapping material used in commerce is provided. The method comprises placing or storing an object for protection in a tray, bag or other container made with a laminate as described herein, or else protecting the item by wrapping it or bringing it into at least partial contact with a shrink or stretch film described herein. The item is then removed to provide a spent laminate, and the spent laminate is introduced into a commercial recycling stream.

Further non-limiting description is provided in the Examples that follow.

EXAMPLE 1

Fibers

ASPUN 6850A LLDPE fiber resin was selected for sample production. In order to modify the UV stability; heat distortion temperature and the crystallization temperature the ASPUN 6850A was mixed with a masterbatch (MB) containing Tinuvin 11, Irganox 1010 and Irgafos 168 (antioxidants and UV inhibitor of Ciba-Geigy) and two Milliken nucleating agents (HL3-4 and HPN-20E) in order to measure the flexural modulus, heat deflection temperature (HDT) and re-crystallization temperature. The following samples were prepared for testing:

| Example Number | Sample Name | MB Loading (%) | HPN-20E Loading (ppm) | Tc (° C.) |
|---|---|---|---|---|
| 1-1 | Control | 0.00 | 0 | 112.00 |
| 1-2 | HL3-4 | 2.00 | 800 | 115.00 |
| 1-3 | HPN-20E | 0.00 | 800 | 114.30 |

Results:

| Sample Number | Sample Name | HDT - 455 kPA (° C.) | Flex Mod (Mpa) | Std. Dev. |
|---|---|---|---|---|
| 1-1 | Control | 60.00 | 658 | 4.00 |
| 1-2 | HL3-4 | 70.00 | 779 | 1.00 |
| 1-3 | HPN-20E | 69.00 | 768 | 4.00 |

Following the initial testing with the nucleating agents; further testing took place to prepare the master batch to further modify the properties of the ASPUN 6850A. Master batches were created and were used to formulate fiber resin with the following compositions:

| Description | PBC0011-1 Ex. 1-4 | PBC0011-2 Ex. 1-5 | PBC0011-3 Ex. 1-6 | PBC0011-4 Ex. 1-7 |
|---|---|---|---|---|
| ASPUN 6850A | 99.5000 | 74.5000 | 97.0000 | 72.0000 |
| TINUVIN 111 | 0.2500 | 0.2500 | 0.2500 | 0.2500 |
| IRGANOX 1010 | 0.1250 | 0.1250 | 0.1250 | 0.1250 |
| IRGAFOS 168 | 0.1250 | 0.1250 | 0.1250 | 0.1250 |
| ASPUN 6850A + 4% LICA38J | | 25.0000 | | 25.0000 |
| NUCLEATING PKG (HPN-20E) | | | 2.5000 | 2.5000 |
| | 100.0000 | 100.0000 | 100.0000 | 100.0000 |

Fibers of 1.3-1.9 denier are spun from the above compositions according to the instructions of the resin supplier. The following properties are obtained, where HDT is measured on the fibers cut to 1.63 inches.

| Description | PBC0011-1 | PBC0011-2 | PBC0011-3 | PBC0011-4 | CONTROL |
|---|---|---|---|---|---|
| Crystallization Temperature (° C.) | 117.30 | 117.50 | 119.00 | 118.20 | 116.50 |
| Crystal Formation Time (min) | 8.53 | 8.62 | 7.27 | 8.08 | 9.52 |
| Flex Mod 1% Secant (Mpa) | 703.00 | 699.00 | 773.00 | 678.00 | 658.00 |
| HDT - 455 kPA (° C.) | 74.60 | 69.80 | 73.40 | 67.00 | 60.00 |

According to test results the PBC0011-3 provided the best overall improvement to the properties to form a fiber.

Example 1-8 is another example of a polyethylene fiber composition used to make a cardable fiber for a nonwoven fabric. This formulation contains a nanoclay.

| Example 1-8 | Staple Fiber % |
|---|---|
| ASPUN 6850A | 94.5000 |
| TINUVIN 111 | 0.2500 |
| IRGANOX 1010 | 0.1250 |
| IRGAFOS 168 | 0.1250 |
| Nano Clay | 2.0000 |
| LICA38J | 0.5000 |
| NUCLEATING PKG | 2.5000 |
| | 100.00 |

EXAMPLE 2

Non-Woven Fabric

Fibers according to Example 1 are formed into a nonwoven fabric by laying down two cards of crimped fibers in the machine direction. In the first card, the fibers are 1.0-1.3 denier. In the second card, the fibers are 1.3-1.7 denier. The cards are laid down at an areal weight of 10-70 grams per square meter in each card. A nonwoven web is produced by hydroentangling.

EXAMPLE 3

Multilayer Film

Individual layers of a film are made using a master batch that contains titanated TiO2, primary and secondary antioxidants and HALS. The master batch is added between 8% and 10% loading between the layers. The desired amount of master batch in the overall film is between 7% and 11% depending on application. The films are between 6.50 mils and 8.00 mils thick. The layer ratios are 20% interface layer, 60% core or middle layer, and 20% outer skin layer. The films are produced by blown film method with a blow up ratio (BUR) of 2.6 to 2.8. The higher blow up ratio provides a higher shrink ratio. The interface layer is corona treated to 48 dynes to improve adhesion during the lamination process. The dyne level of the outside skin layer is left neutral.

Film A:

The master batch used for the film had the following ingredients and percentages: TiO2 66.6; Lica 38J 5.0; carrier resin 20.4; and UV/AO 8.0. UV/AO package for the master batch is made up of CIBA chemistry that includes 4 (50%) TINUVIN 738, 2 (25%) TINUVIN 326 and 2 (25%) IRGANOX B215. The TiO2 loading was at 66.6% and LICA38J from Kenrich Petrochemicals was at 5%. The carrier resin is an LLDPE with a high melt index. If desired the carrier resin can be a LLDPE with a block co-polymer structure such as INFUSE from Dow Chemical. The film was produced using 10% master batch on the top skin layer and the core layer. The inner skin (interface) layer had a clear master batch which did not have any TiO2. The carrier resin made up the difference of the TiO2 in the blend.

The top layer of the film had 10% master batch with TiO2, 30% Plexar PX3410 and 60%, AD1099 Ionomer resin. The middle, core layer had 10% master batch with TiO2, 60% Plexar PX3410 (anhydride modified polyethylene) and 30% AD1099 Ionomer resin. The interface layer had 10% clear master batch without the TiO2, 30% Plexar PX3410 and 60% AD1099 Ionomer resin. The interface layer was treated to 48 dynes. With the above resin distribution the final film had 10% master batch with the ingredients provided on the initial table. 48% LLDPE+3.37% LLDPE from the carrier resin on the master batch; 42% Ionomers, 0.8% UV/AO package, 5.33% color (TiO2) and 0.5% titanate.

The above film sample had the following physical properties:

| Tensile Strength | | |
| --- | --- | --- |
| psi | MD | 2,870 |
| psi | CD | 2,160 |
| Yield Strength | | |
| psi | MD | 1,195 |
| psi | CD | 1,151 |
| Break Elongation | | |
| % | MD | 924 |
| % | CD | 721 |
| Break Load | | |
| lbs | MD | 37 |
| lbs | CD | 30 |
| 2% Modulus | | |
| | MD | 24,176 |
| | CD | 17,944 |
| Elmendorf Tear | | |
| grams | MD | 2,442 |
| grams | CD | 3,231 |
| WVTR | | |
| gr/sqm/24 hr 37.8 C. 100% RH Permeation Per Mil | | |
| gr/sqm/24 hr 37.8 C. 100% RH Permeation Per Mil | | 32.83 236.41 |

Film B

As the first film sample this film used the same color master batch. However on this application the TiO2 master batch was used throughout the layers. The carrier resin on this master batch is to a block co-polymer such as INFUSE from The Dow Chemical Company. The master batch ingredients are as follows: 33.3 $TiO_2$; 2.5 Lica 38J; 60.2 INFUSE; and 4 UV/AO package as above.

The top layer of the film has 20% of the above master batch, 20% of ELITE 5500G and 57% of AD1119 ("smart" ionomer of Dupont), 3% Elvaloy PTW (epoxy functional polymer); The middle core layer has 20% of the above master batch, 45% ELITE 5500G (enhanced polyethylene of Dow), 30% AD1099 (fatty acid modified ionomer of Dupont, potassium neutralized) and 3% Elvaloy PTW; the interface layer has 20% of the above master batch 20% ELITE 5500G and 57% AD1099 and 3% Elvaloy PTW. In the overall structure there will be 48.24% LLDPE, 3% Elvaloy PTW, 40.80% Ionomer, 0.50% titanate, 0.8% UV/AO package, and 6.66% color (TiO2).

The three layer film is investigated by differential scanning calorimetry (DSC). The film exhibits a single sharp melting endotherm at 124.6° C., despite the presence in the film of multiple polymeric components. Elvaloy PTW contains nButyl Acrylate(nBA) with glycidyl methacrylate (GMA). The DSC shows that there is compatibility between the LLDPE, Elvaloy PTW and the Ionomer. The curve has a wide starting angle however there is only one sharp melting point, which shows that an alloy was created with the mixture of these three resins. The alloyed material in the film leads to improved physical properties over immiscible polymer formulations.

We claim:

1. A packaging material in sheet form having a first side for contacting with an object to be packaged and a second side opposite the first to be exposed comprising:
   a. a water vapor permeable thermoplastic film;
   b. a hydrophilic non-woven fabric in contact with the water vapor permeable thermoplastic film along an interface; and
   c. a hot melt adhesive in the interface that intermittently bonds the water vapor permeable thermoplastic film to the hydrophilic non-woven fabric,
wherein the water vapor permeable thermoplastic film has three or more individual layers characterized by increasing water vapor transmission rate with increasing distance from the interface, and wherein the hydrophilic non-woven fabric has two or more individual layers characterized by fibers of different denier, fibers of different hydrophilicity, or both.

2. The packaging material according to claim 1, wherein the water vapor permeable thermoplastic film and hydrophilic non-woven fabric are based on homopolymers and/or copolymers of ethylene, and the fibers of the hydrophilic non-woven fabric are characterized by a heat deflection temperature of 70° C. or higher.

3. The packaging material according to claim 2, wherein the water vapor permeable thermoplastic film comprises a plurality of carboxylate groups neutralized with potassium ions.

4. The packaging, material according to claim 2, wherein the water vapor permeable thermoplastic film comprises low density polyethylene (LDPE), or linear low density polyethylene (LLDPE).

5. The packaging material according to claim 2, wherein the water vapor permeable thermoplastic film comprises a plurality of co-extruded layers, including an interface layer adjacent the interface, a skin layer forming an outside layer of the sheet, and one or more intermediate layers disposed between the interface and skin layers.

6. The packaging material according to claim 5, wherein the water vapor permeability and hydrophilicity of the skin layer is higher than that of the interface layer.

7. The packaging material according to claim 6, wherein the interface layer comprises calcium carbonate and the skin layer comprises a plurality of potassium neutralized carboxylate groups.

8. The packaging material according to claim 2, wherein the hydrophilic non-woven fabric comprises a plurality of layers including an interface layer adjacent the interface with the water vapor permeable thermoplastic film and an outside layer forming the first side of the sheet, wherein the hydrophilicity of the outside layer is less than the hydrophilicity of the interface layer.

9. The packaging material according to claim 8, wherein the interface layer and the outside layer contain fibers of different size, the fibers in the interface layer being greater in diameter than the fibers in the outside layer.

10. The packaging material according to claim 8, wherein the hydrophilic non-woven fabric comprises staple fibers of LLDPE.

11. The packaging material according to claim 9, wherein the hydrophilic non-woven fabric comprises fibers of 1.2-1.5 denier.

12. A packaging product in sheet form, the sheet made up of materials to build up a laminate, the laminate comprising:
   a first material comprising a shrink-stretch film with water vapor permeability of no less than 30 grams per square meter per day and forming a first side of the laminate;

a second material forming a second side of the laminate and comprising a multilayer non-woven fabric, the multilayer non-woven fabric having a plurality of layers of differing hydrophilicity; and a third material comprising a hot melt adhesive disposed at an interface between and bonding together the first and second material;

wherein the shrink-stretch film, the multilayer non-woven fabric and hot melt adhesive comprise homopolymers or copolymers of ethylene.

13. The packaging product according to claim 12, wherein the shrink-stretch film comprises calcium carbonate filler.

14. The packaging product according to claim 12, wherein the shrink-stretch film comprises a polyolefin and an ionomer having a plurality of carboxylate groups at least partially neutralized with potassium and/or sodium.

15. The packaging product according to claim 12, wherein the shrink-stretch film comprises a plurality of layers including an interface layer adjacent the interface and one or more outside layers disposed on the interface layer, wherein the layers exhibit increasing vapor permeability in order of increasing distance from the interface.

16. The packaging product according to claim 12, wherein the shrink-stretch film thickness is from 3 mils to 9 mils.

17. The packaging product according to claim 12, wherein the multilayer non-woven fabric is made of layers having differing fiber sizes.

18. The packaging product according to claim 17, wherein the layers comprise crimped staple fibers.

19. The packaging product according to claim 12, wherein the hydrophilicity of the layers of the multilayer non-woven fabric increases in order from the second side of the sheet material to the interface.

* * * * *